US012214611B2

(12) United States Patent
Brandimore et al.

(10) Patent No.: US 12,214,611 B2
(45) Date of Patent: Feb. 4, 2025

(54) SCRATCH-OFF DOCUMENT ALTERING AND COPYING COUNTERMEASURES

(71) Applicant: IGT Global Solutions Corporation, Providence, RI (US)

(72) Inventors: Joseph Brandimore, Lakeland, FL (US); Kenneth E. Irwin, Jr., Dawsonville, GA (US); Amy Kathleen Pettis, Lakeland, FL (US)

(73) Assignee: IGT GLOBAL SOLUTIONS CORPORATION, Providence, RI (US)

( * ) Notice: Subject to any disclaimer, the term of this patent is extended or adjusted under 35 U.S.C. 154(b) by 0 days.

(21) Appl. No.: 18/476,655

(22) Filed: Sep. 28, 2023

(65) Prior Publication Data

US 2024/0190158 A1 Jun. 13, 2024

Related U.S. Application Data

(63) Continuation of application No. 18/065,295, filed on Dec. 13, 2022, now Pat. No. 11,807,028.

(51) Int. Cl.

| | |
|---|---|
| ***B42D 25/27*** | (2014.01) |
| ***A63F 3/06*** | (2006.01) |
| ***B42D 25/387*** | (2014.01) |

(52) U.S. Cl.

CPC .............. *B42D 25/27* (2014.10); *A63F 3/065* (2013.01); *A63F 3/0665* (2013.01); *B42D 25/387* (2014.10); *A63F 3/0655* (2013.01)

(58) Field of Classification Search

CPC ........ B42D 25/27; A63F 3/065; A63F 3/0665; A63F 3/0655

(Continued)

(56) References Cited

U.S. PATENT DOCUMENTS

| | | | |
|---|---|---|---|
| 4,540,628 | A | 9/1985 | Oberdeck et al. |
| 5,346,258 | A | 9/1994 | Behm et al. |

(Continued)

FOREIGN PATENT DOCUMENTS

| | | | |
|---|---|---|---|
| CA | 2278895 | A1 | 1/2000 |
| CA | 2666784 | A1 | 12/2009 |

(Continued)

OTHER PUBLICATIONS

Simske, Steven J., et al., "Variable Data Void Pantographs", HP Laboratories: HPL-2011-183, https://www.hpl.hp.com/techreports/2011/HPL-2011-183.pdf, Oct. 6, 2011.

(Continued)

*Primary Examiner* — Kyle R Grabowski

(74) *Attorney, Agent, or Firm* — Neal, Gerber & Eisenberg LLP

(57) ABSTRACT

A full-color protected document, and methods and systems for making same, secured by a removable Scratch-Off Coating, where the protection against document alteration and/or copy type attacks is provided by digitally imaging Benday patterns and/or digital imaged background patterns around the variable indicia. By printing Benday patterns and/or imaged background using the same process color imagers, usability and integrity of the protected document are achieved relative to the consumer's perspective while at the same time providing a more secure, less expensive, and more aesthetically pleasing document design.

14 Claims, 18 Drawing Sheets
(15 of 18 Drawing Sheet(s) Filed in Color)

(58) Field of Classification Search
USPC .......................................................... 283/903
See application file for complete search history.

(56) References Cited

U.S. PATENT DOCUMENTS

| | | | | |
|---|---|---|---|---|
| 5,479,507 | A | 12/1995 | Anderson | |
| 5,542,710 | A | 8/1996 | Silverschotz et al. | |
| 5,667,250 | A | 9/1997 | Behm et al. | |
| 5,704,647 | A | 1/1998 | Desbiens | |
| 5,769,458 | A | 6/1998 | Carides et al. | |
| 5,803,504 | A | 9/1998 | Desbiens et al. | |
| 6,939,627 | B2 | 9/2005 | Morizumi et al. | |
| 7,252,222 | B2 | 8/2007 | Irwin et al. | |
| 7,665,732 | B2 | 2/2010 | Stephens | |
| 7,720,421 | B2 | 5/2010 | Snyder | |
| 8,074,570 | B2 | 12/2011 | Grotkowski et al. | |
| 8,342,576 | B2 | 1/2013 | Eschbach et al. | |
| 8,366,153 | B2 | 2/2013 | Martineck | |
| 8,883,390 | B1 | 11/2014 | Tyagi et al. | |
| 9,087,288 | B2 | 7/2015 | Altfeder et al. | |
| 10,183,213 | B2 | 1/2019 | Irwin et al. | |
| 10,232,247 | B2 | 3/2019 | Finnerty et al. | |
| 10,377,162 | B2 | 8/2019 | Finnerty et al. | |
| 10,543,712 | B2 | 1/2020 | Behm et al. | |
| 10,752,035 | B2 | 8/2020 | Finnerty et al. | |
| 11,351,445 | B2 | 6/2022 | Tevis et al. | |
| 11,383,154 | B2 | 7/2022 | Irwin | |
| 2005/0133584 | A1* | 6/2005 | Finnerty | G07D 7/206 235/494 |
| 2010/0321738 | A1 | 12/2010 | Wu et al. | |
| 2012/0025516 | A1 | 2/2012 | Miller et al. | |
| 2012/0145024 | A1* | 6/2012 | Scrymgeour | A63F 3/0655 101/483 |
| 2012/0267888 | A1* | 10/2012 | Behm | A63F 3/0665 283/100 |
| 2014/0293357 | A1 | 10/2014 | Altfeder et al. | |
| 2017/0361211 | A1* | 12/2017 | Gaynor | B42D 25/21 |
| 2018/0020126 | A1 | 1/2018 | Weil et al. | |

FOREIGN PATENT DOCUMENTS

| | | | |
|---|---|---|---|
| CA | 2761324 | A1 | 6/2012 |
| EP | 0707507 | A1 | 4/1996 |
| JP | H08244389 | A | 9/1996 |
| WO | 9720699 | A1 | 6/1997 |
| WO | 2009062297 | A1 | 5/2009 |
| WO | 2011117687 | A1 | 9/2011 |

OTHER PUBLICATIONS

"Combined Search and Examination Report", from related Great Britain Patent Application No. GB2317641.5, May 17, 2024.

* cited by examiner

SCRATCH-OFF DOCUMENT ALTERING AND COPYING COUNTERMEASURES

PRIORITY

This continuation patent application claims priority to and the benefit of U.S. patent application Ser. No. 18/065,295, filed Dec. 13, 2022, the entire contents of which is incorporated herein by reference.

BACKGROUND

The present disclosure relates generally to documents, such as instant lottery tickets, having variable indicia under a Scratch-Off Coating ("SOC"), and systems, methods, and devices that provide protection against document alteration attacks as well as against the use of copies of SOC protected documents.

Instant lottery tickets have become a time-honored method of raising revenue for local and national governments the world over. The concept of hiding variable indicia (such as variable play symbols) under a SOC has also been applied to numerous other documents such as commercial contest documents, telephone cards, gift cards, etc. Billions of SOC protected documents are literally printed every year where the SOCs are used to ensure that the documents have not been previously used, played, or modified. SOC instant lottery tickets are used as the primary example of such documents herein but are not meant to limit the present disclosure.

The variable indicia can be printed using a specialized high-speed ink jet providing a human readable indication of the value of each instant lottery ticket. In lottery jurisdictions where no automated validation system is available to verify that a given instant lottery ticket is a winner at the time of redemption, the reliance on retailer clerk sight validation of such instant lottery tickets creates an opportunity for illicit consumer fraud using document alteration techniques to create apparent winning instant lottery tickets. These types of document alteration attacks occur primarily as cut and paste alterations where one or more play symbols are removed from one or more losing donor instant lottery tickets and pasted onto another losing instant lottery ticket to create an apparent winning instant lottery ticket.

One known countermeasure against ticket alteration attacks is to use a Benday pattern (printed with static printing plates as further described below) in the area of the instant lottery ticket under the SOC (that is often referred to as the scratch-off area) in an attempt to make ticket alternations involving cut and paste methods more obvious to retail clerks upon visual inspection of such instant lottery tickets. FIG. 1A shows two example Benday patterns plate printed on the backgrounds of the scratch-off areas of two known instant lottery tickets. FIG. 1A shows the two different exemplary instant lottery tickets 100 and 101 with Benday patterns 105 and 106 plate printed in the respective backgrounds of the scratch-off areas under the respective variable indicia 103 and 104. Instant lottery ticket 100 is shown with some of the SOC 102 remaining on the substrate of the instant lottery ticket 100. The example Benday patterns 105 and 106 plate printed on the respective backgrounds of these example instant lottery tickets 100 and 101 are low contrast relative to their respective backgrounds. This low contrast background is necessary to ensure sufficient contrast with the variable indicia such that the consumer can readily identify any winning symbols on such instant lottery tickets 100 and 101.

By applying a digital filter (that eliminates any objects wider than the Benday lines as well as any objects that are not the same color) to the instant lottery ticket 100, the ticket's Benday pattern 105 becomes more obvious as shown by the enlarged Benday pattern 105' also shown in FIG. 1A. From the enhanced filtered Benday pattern 105', it can be seen that any cut and paste attempt to mortise a winning pattern of symbols onto a single instant lottery ticket would cause a break in the Benday lines (so long as the cut and paste donor tickets had different Benday patterns). However, since known Benday patterns are not imaged, but rather printed with static printing plates (e.g., such as Flexographic, Gravure, or offset printing plates) on a printing press, any given known Benday pattern will repeat periodically throughout a pack of instant lottery tickets. Given that gaining access to losing instant lottery tickets is not difficult (since there is no perceived value in the losing instant lottery tickets) it is not a complicated task to amass a collection of such losing instant lottery tickets with identical background plate printed Benday patterns distributed over a periodic basis. Once the collection of identical plate printed Benday patterns is acquired, it becomes possible to generate cut and paste forged apparent winning instant lottery tickets using only identical Benday patterns, thereby defeating this known intended countermeasure using such plate printed Benday patterns.

In addition to the visible instant lottery ticket plate printed Benday patterns of FIG. 1A that function as a countermeasure to cut and paste forgeries, normally invisible (under white light illumination) Benday patterns have been plate printed on the substrates of instant lottery tickets. Such plate printed Benday patterns become visible under Ultraviolet (UV) light illumination. For example, FIG. 1B illustrates a portion of an instant lottery ticket 107 with its SOC removed and showing variable indicia 108 that are visible under normal white light as well as a surreptitious plate printed Benday pattern 109 that is only visible under UV illumination. These Benday patterns are utilized by lotteries as a method for enabling verification of an instant lottery ticket's authenticity and integrity as well as potentially proving a countermeasure to cut and paste forgery attacks.

In addition to the above example plate printed Benday patterns used on instant lottery tickets, a known countermeasure to protecting against copying of various types of documents is the use of void pantographs to print extra information that is apparent when the document is copied (such as via photocopying, scanning, or otherwise), but invisible or not apparent when the document is viewed by the unaided human eye. For example, FIG. 1C illustrates an original document 110 and a photocopy document 111 of the same document. Embedded in the background 112 of the original document 110 is a concealed message 113 (in this example, "VOID") that is difficult to detect with the unaided human eye. However, if the original document 110 is photocopied to create the photocopy document 111, the concealed message 114 becomes readily apparent. This void pantograph effect is made possible by printing a light-colored concealed message with halftone screening that is manipulated to produce a dot pattern that is not apparent to the unaided human eye, but that a wide range of scanners and copiers will detect.

BRIEF SUMMARY

Various embodiments of the present disclosure provide a document such as a lottery ticket including: a substrate; an imaged background printed on a first area of the substrate;

variable indica printed on a second area of the substrate; a Benday pattern printed on the first area, the Benday pattern comprising a void pantograph, the void pantograph being printed such that the Benday pattern is not apparent to the unaided human eye when viewing the lottery Benday pattern on the first area, but is readily apparent to the unaided human eye when viewing a copy of the Benday pattern; and a scratch off coating covering at least a portion of the first and second areas.

Various other embodiments of the present disclosure provide a plurality of documents such as a plurality of lottery tickets for a single lottery game, wherein the plurality of lottery tickets include: (1) a first lottery ticket including: a first substrate; a background imaged on a first area of the first substrate; variable indica imaged on a second area of the first substrate; a Benday pattern imaged on the imaged background, the Benday pattern printed with dye-based ink; and a scratch-off coating covering at least a portion of the first and second areas of the first substrate; and (2) a second lottery ticket including: a second substrate; a background imaged on a first area of the second substrate; variable indica imaged on a second area of the second substrate; a Benday pattern imaged on the imaged background and variable indicia, the Benday pattern printed with dye-based ink; and a scratch-off coating covering at least a portion of the first and second areas of the second substrate.

Various embodiments of the present disclosure provide a document such as a lottery ticket including: a substrate; a background imaged on a first area of the substrate; variable indica imaged on a second area of the substrate; a Benday pattern in the imaged background, the Benday pattern printed as a process color; and a scratch-off coating covering at least a portion of the first and second areas.

Additional features are described herein and will be apparent from the following Detailed Description and the figures.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
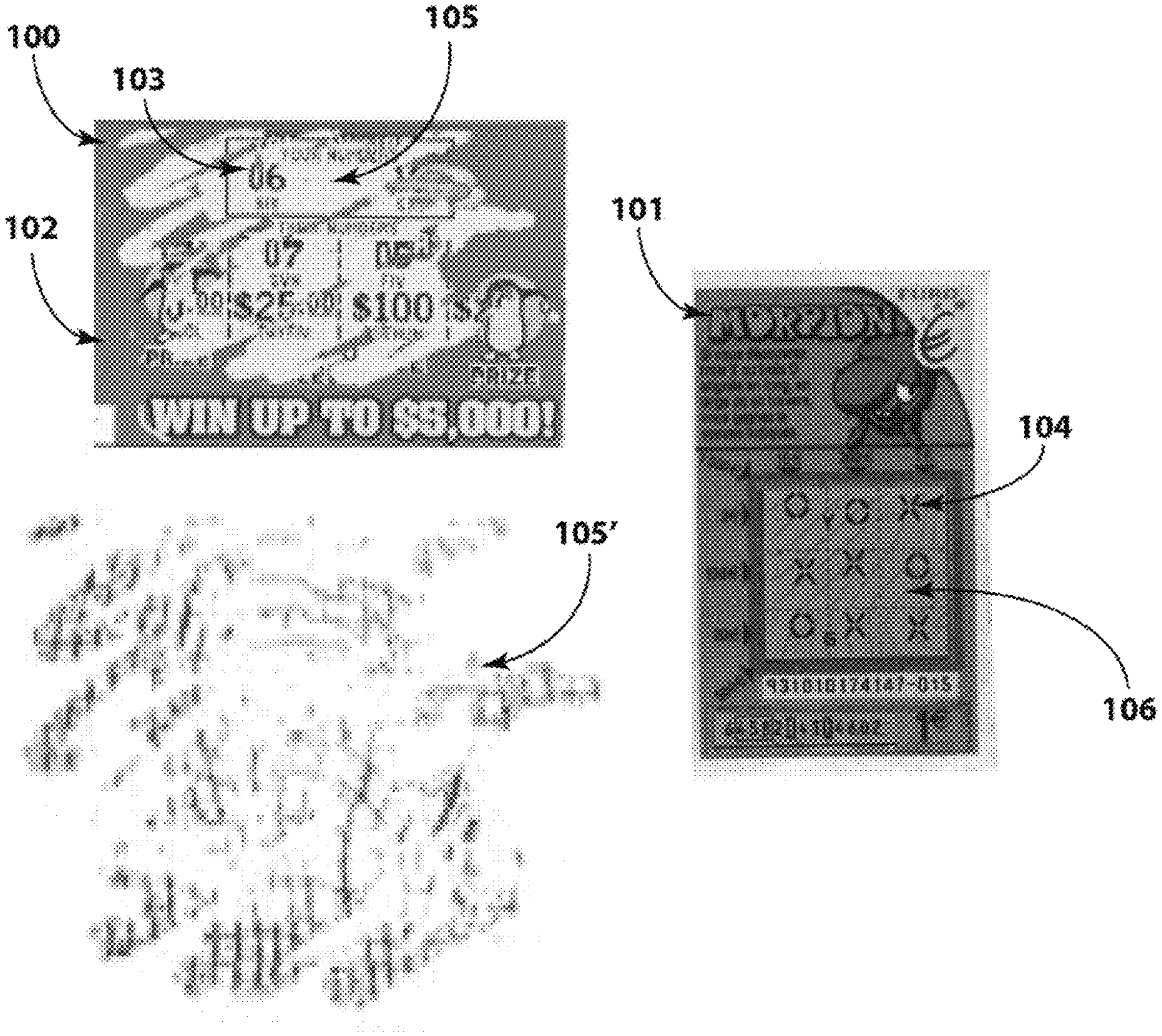
FIG. 1A PRIOR ART
FIG. 1A illustrates front views of two example known instant lottery tickets with known Benday patterns printed on the background areas under the variable indicia and showing an enlarged portion of an example Benday pattern removed an instant lottery ticket.
Figure 1B:
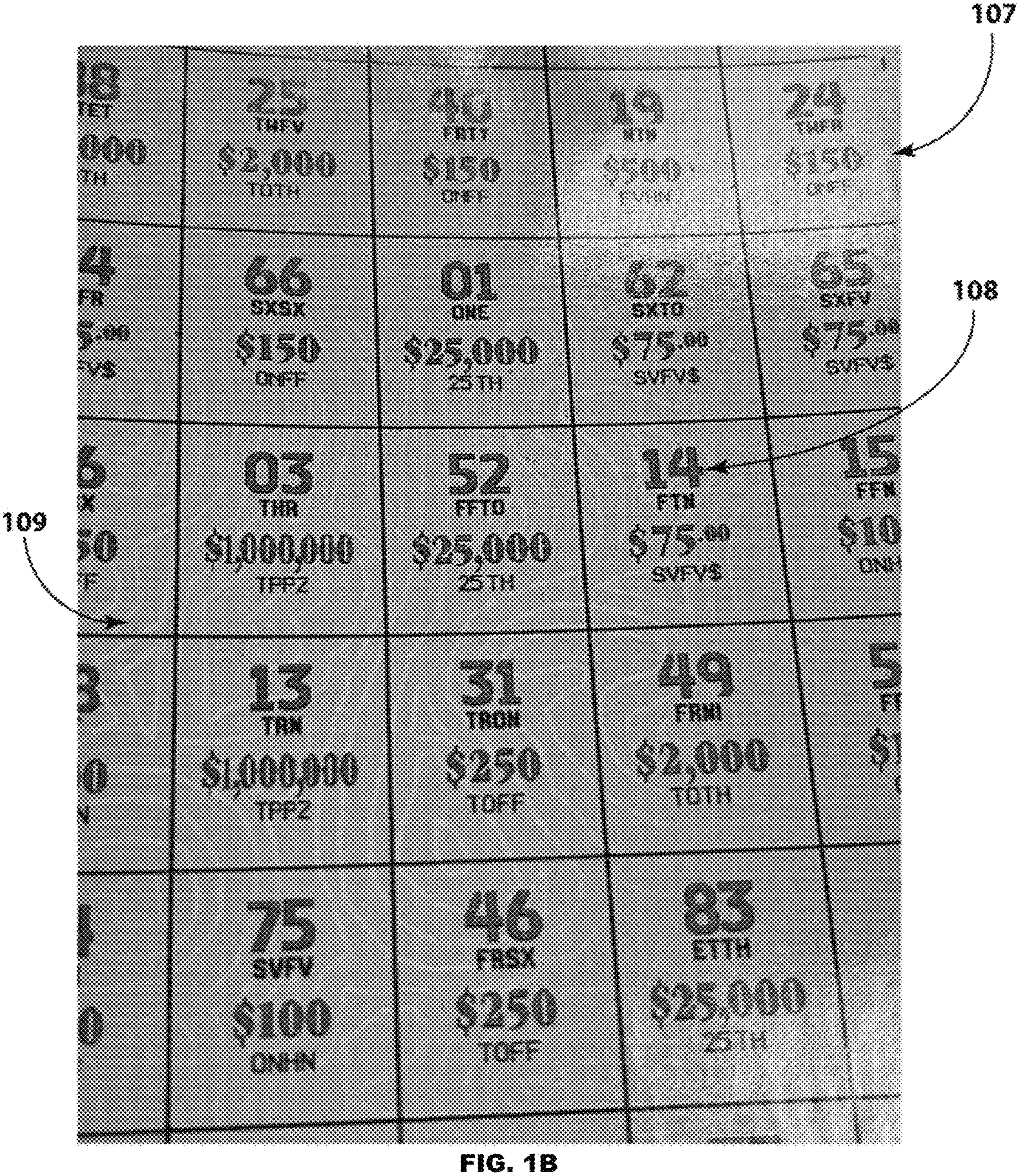
FIG. 1B PRIOR ART
FIG. 1B illustrates a front view of a portion of an example known scratch-off lottery ticket showing an ultraviolet fluorescent Benday pattern that would normally be invisible under white light and is visible (as shown) under ultraviolet light illumination.
Figure 1C:
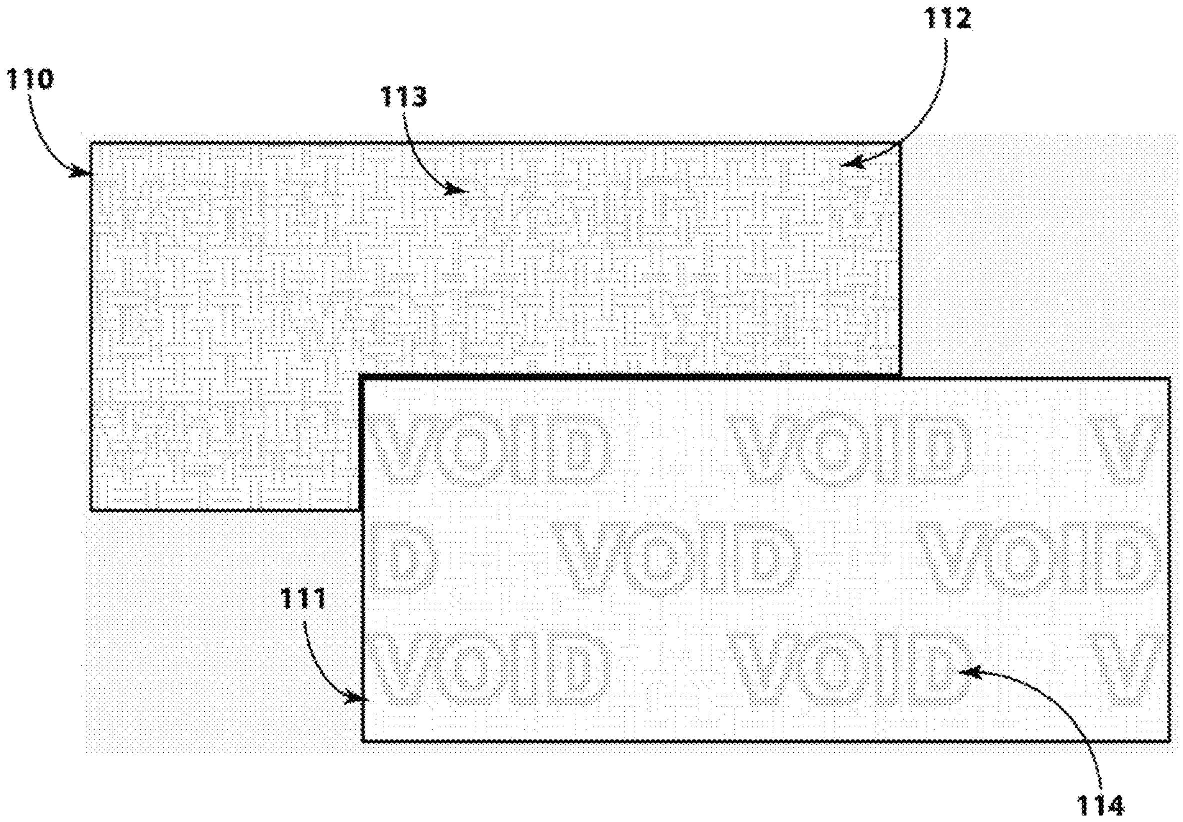
FIG. 1C PRIOR ART
FIG. 1C illustrates two front views of an example portion of a document having void pantographs, with the first view showing how the original document would appear to the unaided human eye, and with the second view showing how a photocopy of the same document would appear to the unaided human eye.

Certain terminology is used herein for convenience only and is not to be taken as a limitation on the present disclosure.

As indicated above, instant lottery tickets (which are sometimes referred to herein as a "lottery ticket" or as a "ticket") are meant to be examples of any "scratch-off document" and are not meant to limit the scope of the present disclosure.

The terms "image" or "print" are used to refer to indicium or indicia created directly or indirectly on any substrate or surface by any known or new imaging or printing method or equipment.

The term "void pantograph" is used to refer to extra information printed in the scratch-off area of a document that is not apparent when viewed by the unaided human eye but that becomes apparent when viewed by a suitable technique or device (e.g., mobile phone camera and application). While the term "void pantograph" has been used in the industry to refer to specific steganographic technique, in the context of the present disclosure, it is used to refer to any type of steganographic technique used to print a Benday pattern that is not readily apparent to the human eye.

The terms "full-color" and "process color" are used interchangeably to refer to a variety of colors produced by discrete combinations of applications of primary inks or dyes "CMY" (i.e., Cyan, Magenta, and Yellow), or the more common four color "CMYK" (i.e., Cyan, Magenta, Yellow, and blacK), or in some cases six colors (e.g., Hexachrome printing process uses CMYK inks plus Orange and Green inks), or alternatively eight colors—e.g., CMYK plus lighter shades of cyan (LC), magenta (LM), yellow (LY), and black (YK).

The term "ink" is used to refer to either or both of "pigmented inks" and well as "colored dyes."

The term "composite color" is used to refer to two or more individual colors used to comprise an overall "process color."

The term "component color" is used to refer to a single individual color that is used with at least one other component color to create a combined "composite color" or "process" color.

The term "variable indicium or indicia" is used to refer to imaged indicia that indicates information relating a property, such as without limit, a value of the document (such as but not limited to an instant lottery ticket, a coupon, a commercial game piece, or the like, where the variable indicium or indicia (such as win or lose symbols) is or are hidden by one or more SOC (until the information or value is authorized to be seen, such as by a holder (such as a purchaser) of the document who removes the SOC, revealing the variable indicium or indicia. Examples of variable indicia as a printed embodiment include letters, numbers, symbols, icons, or figures.

The terms "photocopy" and "copy" are used to refer to a reproduction or facsimile of a document (such as an original document). This "photocopy" or "copy" could physically be embodied as a scanned image of the document that is subsequently printed, a photocopy of the document, a printed photograph of the document, or otherwise.

The term "imaged background" is used to refer to the background area immediately surrounding variable indicia and including imaged process color ink.

Reference will now be made in detail to examples of the present disclosure where various embodiments of which are illustrated in the drawings. Each example is provided by way of explanation of the present disclosure, and not meant to limit the present disclosure. For example, features illustrated or described as part of one embodiment, can be used with another embodiment to yield still a further embodiment. The present disclosure encompasses these, and other modifications and variations as come within the scope and spirit of the present disclosure. As mentioned above, instant lottery tickets are used herein as an example of the documents of the present disclosure for brevity and are not meant to limit the present disclosure.

Figure 2A:
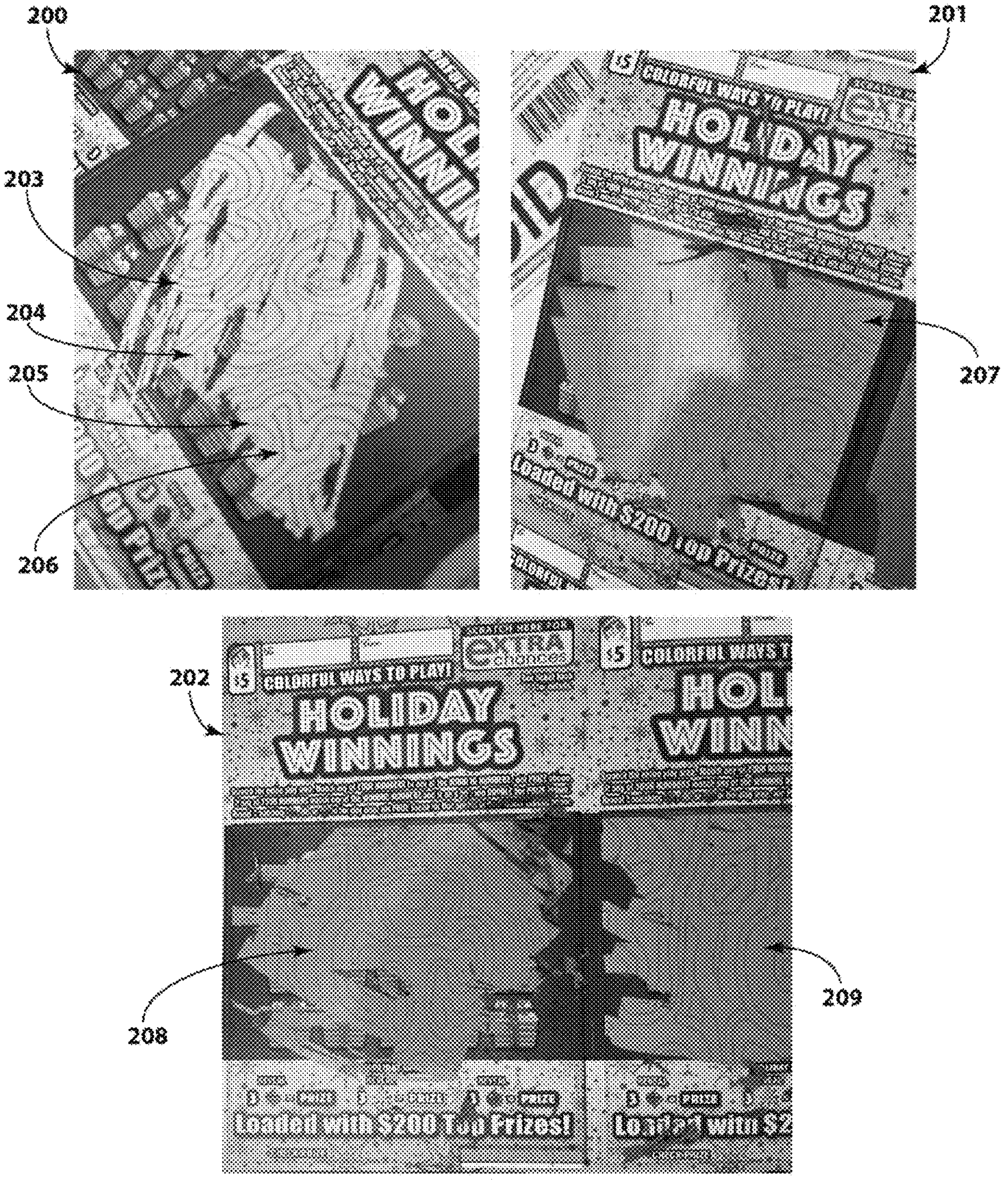
FIG. 2A illustrates front views of example multiple color Benday patterns imaged on instant lottery tickets showing one example embodiment of the present disclosure shown after the SOC on the instant lottery ticket has been partially removed.
Figure 2B:
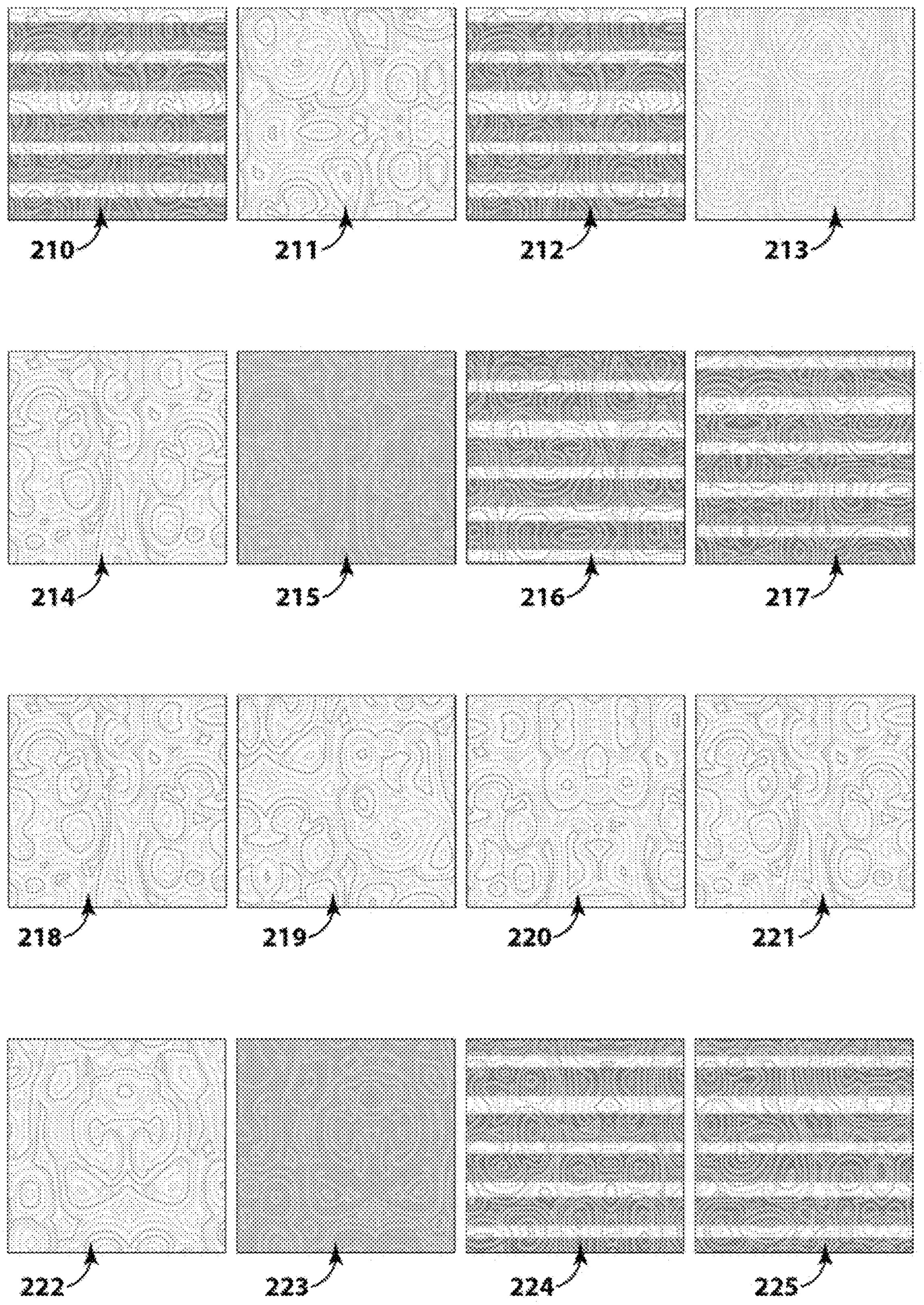
FIG. 2B illustrates front views of different example multiple color Benday patterns imaged on instant lottery tickets showing additional examples of the embodiment of FIG. 2A.

Various embodiments of the present disclosure relate to documents such as instant lottery tickets with variable Benday patterns digitally imaged at the same time (such as with the same physical printhead) as the variable indicia. The present disclosure also relates to methods and systems for printing both the variable Benday patterns and the variable indicia where each can potentially vary with a plurality or with every instant lottery ticket printed for a given lottery game resulting in instant lottery tickets for a lottery game with greatly increased countermeasures to ticket alteration attacks. In various embodiments, the digitally imaged Benday patterns include multiple colors (such as shown in FIGS. 2A and 2B) that can continuously vary from ticket-to-ticket of a lottery game. The present disclosure contemplates that the Benday patterns can be created as separate artwork drawings or digitally generated mathematical functions (such as but not limited to sine waves with varying phase, frequency, and/or amplitude; phase coded waveforms; complex sinusoids; etc.) essentially plotted on an X/Y grid that coincides with the scratch-off area of an instant lottery ticket.

Figure 2C:
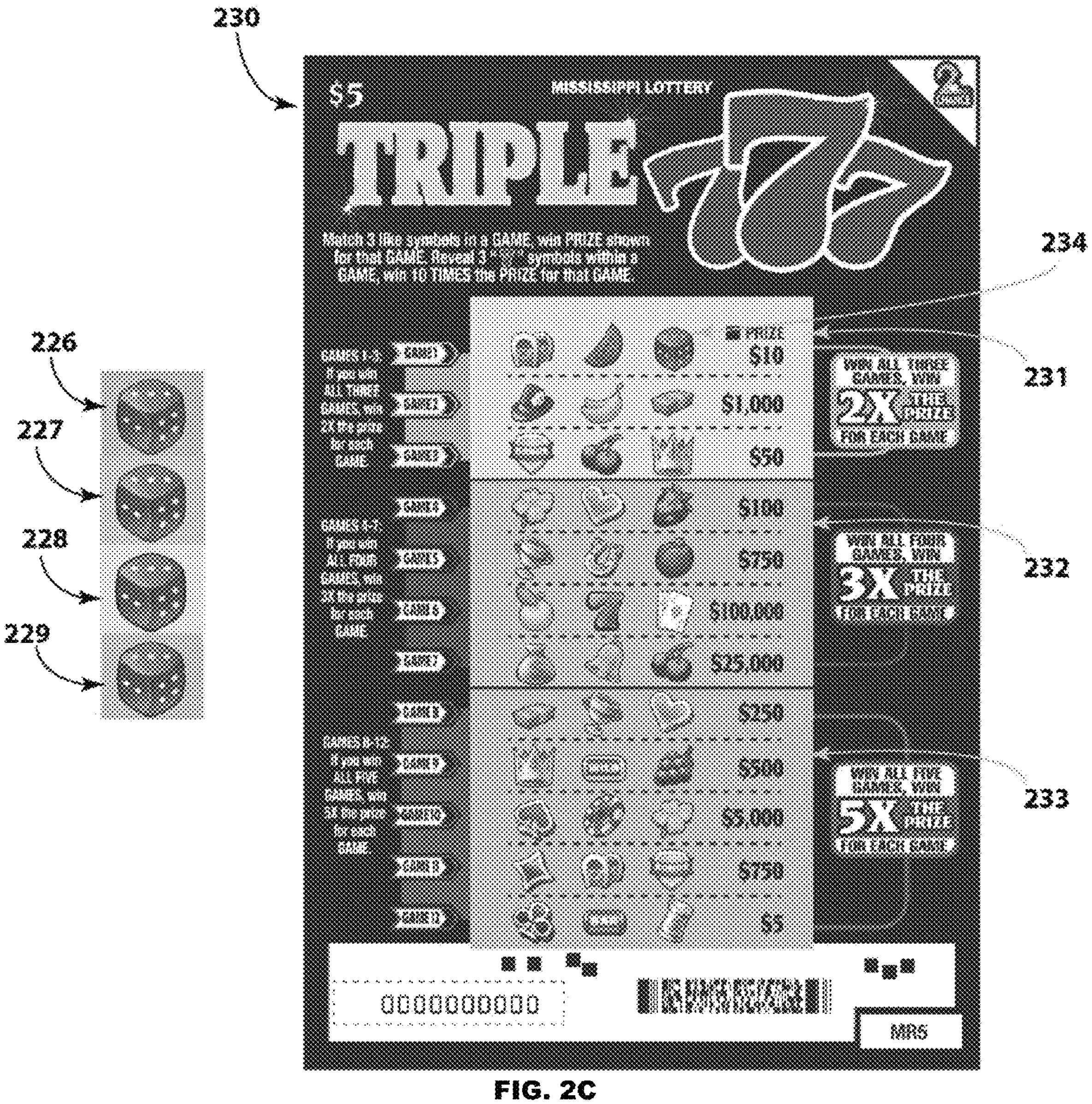
FIG. 2C illustrates a front view with different example multiple color solid imaged background patterns printed on an instant lottery ticket showing an alternate example embodiment of the present disclosure illustrated after the SOC has been removed from the instant lottery ticket.
Figure 2D:
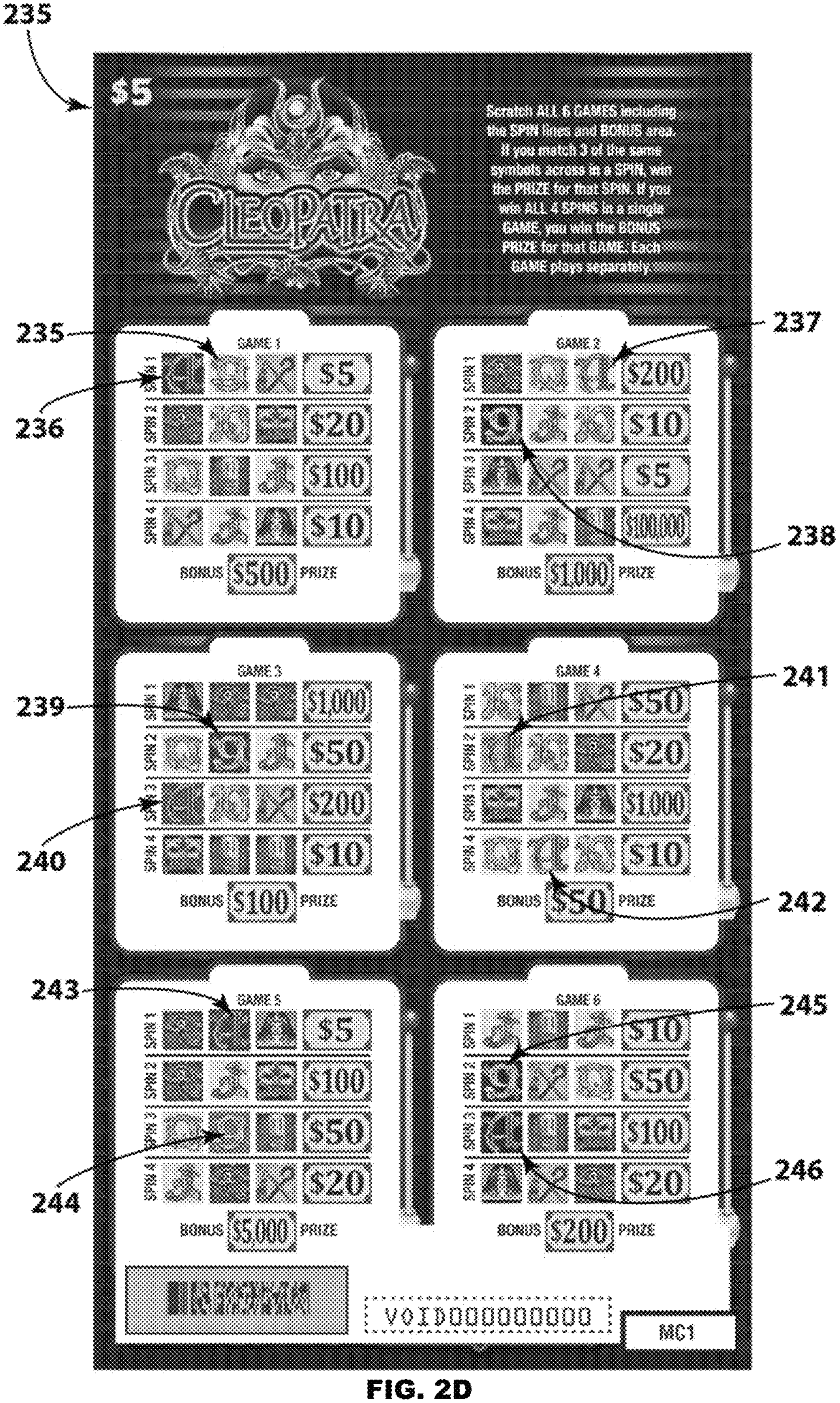
FIG. 2D illustrates a front view with different multiple color solid imaged backgrounds printed behind each indicum on an example instant lottery ticket showing a second alternative example embodiment of the present disclosure illustrated after the SOC has been removed from the instant lottery ticket.

Various embodiments of the present disclosure also provide instant lottery ticket (and methods and systems for creating same) with digitally imaged Benday imaged backgrounds printed in the areas behind the variable indicia. In various such embodiments, these imaged backgrounds can be a solid color (such as shown in FIGS. 2C and 2D) that varies across the instant lottery ticket and/or from ticket-to-ticket. By varying the solid color imaged backgrounds surrounding the variable indicia, the benefits of traditional plate printed Benday pattern countermeasures to ticket alteration attacks can be realized with the added advantages of a more difficult ticket to replicate and a more aesthetically pleasing ticket appearance because of the associated less cluttered background. The present disclosure contemplates that the solid color imaged background countermeasure is enhanced by requiring an illicit perpetrator to find the desired indicia in a losing instant lottery ticket that also has the same-colored imaged background (from a limited collection of losing instant lottery tickets for this specific lottery game) prior to attempting a ticket alteration attack. Thus, by varying the imaged background solid colors sufficiently, the solid color imaged background countermeasure offers higher levels of security than traditional monochromatic Benday patterns due to the higher quantity of possible combinations without the disadvantage of potentially lost aesthetics.

Figure 2E:
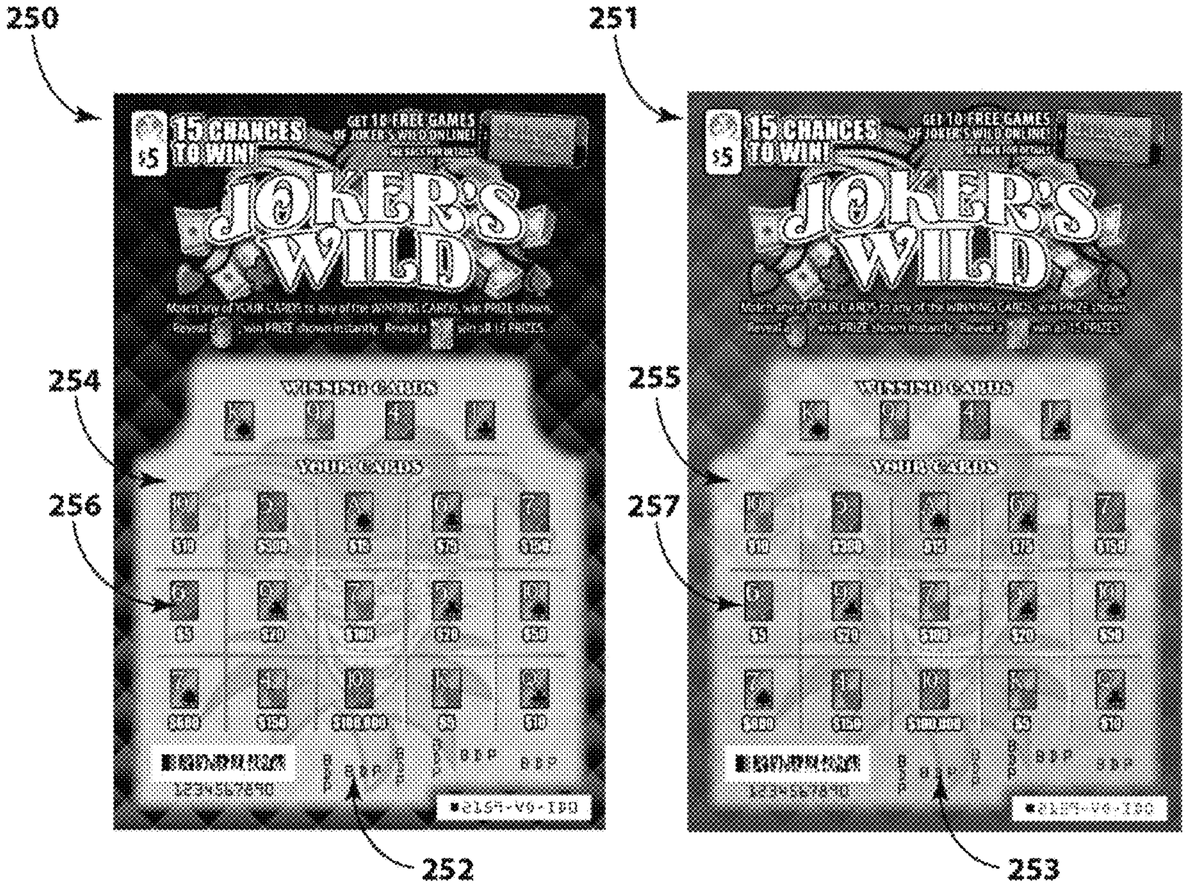
FIG. 2E illustrates front views of imaged backgrounds that include different example artistic images (i.e., Joker faces) printed behind the ticket's variable indicia showing a third alternative example embodiment of the present disclosure illustrated after the SOCs have been removed from the instant lottery tickets.
Figure 2F:
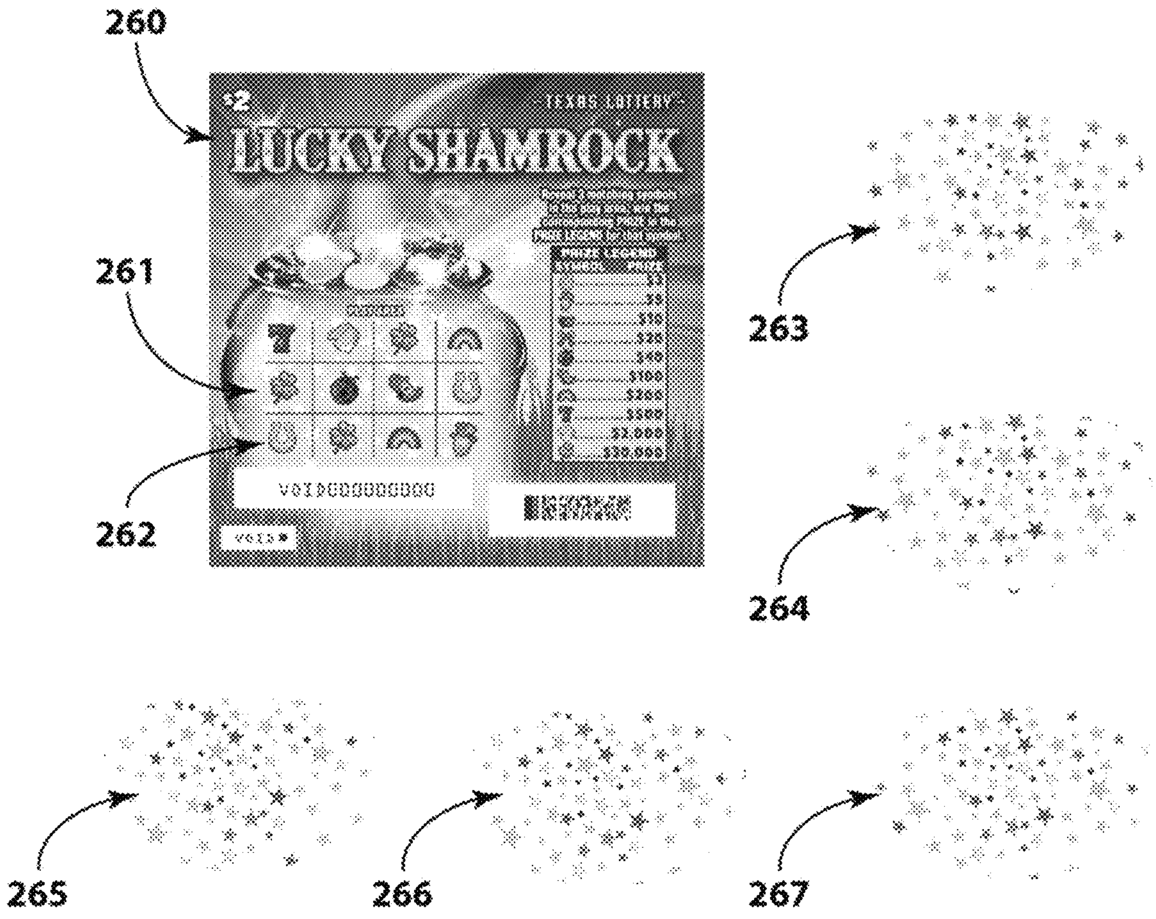
FIG. 2F illustrates front views of example rotational imaged background patterns (i.e., stars) that are rotated from ticket-to-ticket and printed behind the variable indicia and showing a fourth alternative example embodiment of the present disclosure illustrated after the SOC has been removed from the instant lottery ticket.
Figure 2G:
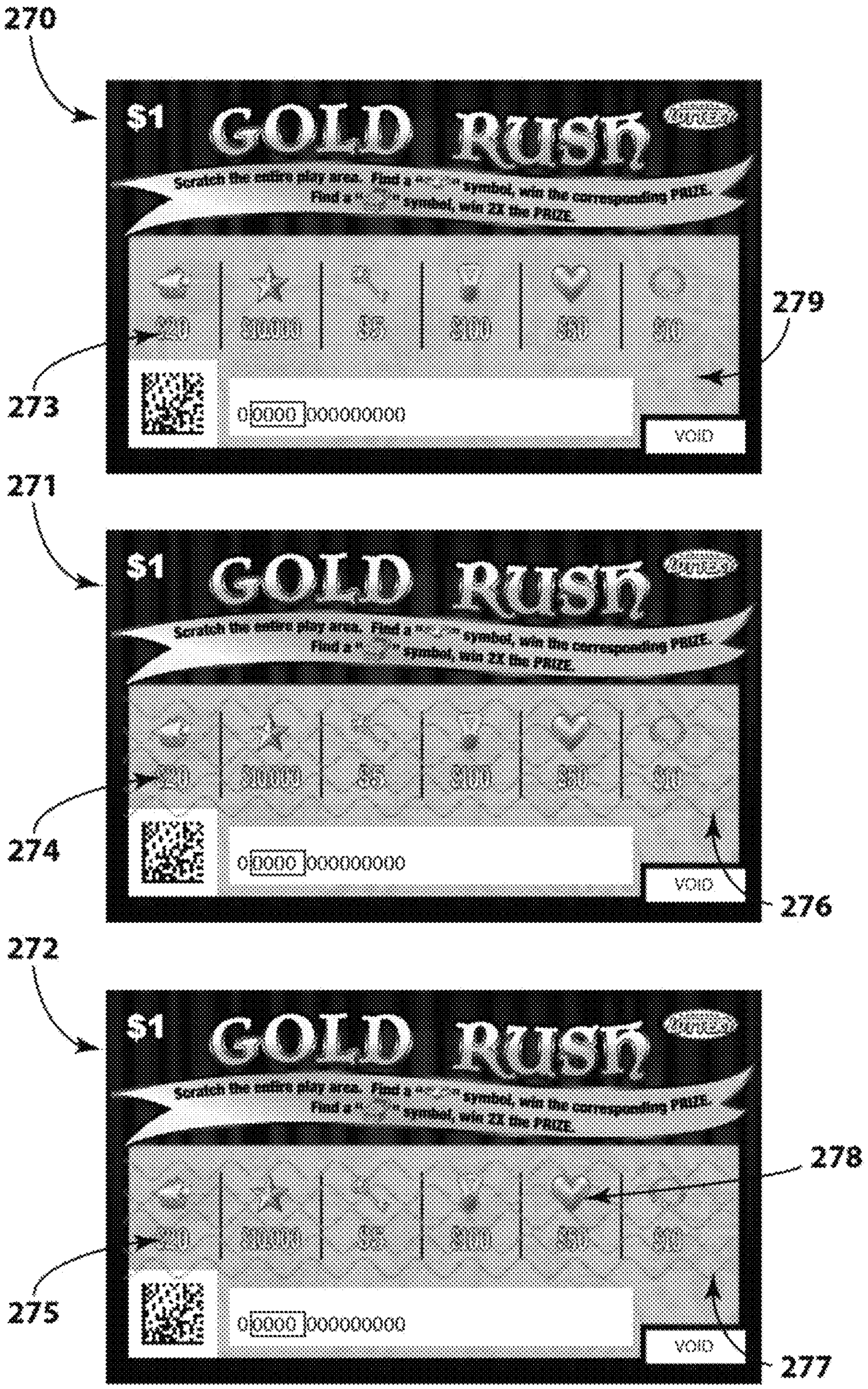
FIG. 2G illustrates front views of three example instant lottery tickets with the SOCs removed, with the first view showing how the original instant lottery ticket would appear to the unaided human eye, and with the second and third views showing how a photocopy of the original instant lottery ticket would include previously hidden Benday patterns that are not apparent to the unaided human eye on the original instant lottery ticket.

In various alternate embodiments of the present disclosure, the instant lottery ticket can include a digitally imaged background having a low contrast graphical representation (such as a picture or artwork such as shown in FIGS. 2E, 2F, and 2G) in the areas behind the variable indicia as a countermeasure to ticket alteration attacks. The addition of the graphical representation (such as the picture or artwork) to the imaged background both ensures ease of variable indicia identification by the consumer (due to the low contrast background) as well as enhanced security against ticket alteration attacks when compared to traditional plate printed Benday patterns while at the same time generally creating a more aesthetically pleasing instant lottery ticket. This enhanced security is attributable to the graphical representation (such a picture or artwork) effectively defining different locations of the scratch-off area thereby requiring an illicit perpetrator to find any desired indicum in the same location from different losing instant lottery tickets, again effectively implementing a countermeasure with far greater variation then is possible with plate printed Benday patterns. The addition of a digitally imaged background with an embedded low contrast image in accordance with the present disclosure is more complex and consequently more likely to reveal a ticket alteration attack. The present disclosure also contemplates that by altering the image in the digitally imaged background from ticket-to-ticket by either changing the color (e.g., FIG. 2E) and/or the background image itself (e.g., FIG. 2F), a very large number of background permutations can be achieved that would not be possible with traditional plate printed Benday patterns.

Various other embodiments of the present disclosure relate to digitally imaged Benday patterns that are not readily apparent to the human eye imaged in the areas behind and/or on top of the variable indicia such that the imaged Benday pattern is not apparent to an unaided human eye perceiving the instant lottery ticket, but that become readily apparent when viewed with the aid of a device (such as shown in FIG. 2G). These embodiments are particularly suited for forensic examination of an apparent winning instant lottery ticket where the illicit perpetrator of a ticket alteration attack would most likely be unaware of the hidden Benday pattern.

In various such embodiments of the present disclosure, an imaged Benday pattern that is not readily apparent to the human eye is implemented via a hidden Benday application of a "void pantograph" that, via steganography, includes extra printed information in the ticket's scratch-off area that is only apparent when the document is copied or viewed by a device, but not apparent when viewed by the unaided human eye. In various embodiments of the present disclosure, this void pantograph is made possible by printing a light-colored concealed Benday pattern with halftone screening that is manipulated to produce a dot pattern that is not apparent to the unaided human eye, but that a wide range of scanners, copiers, as well as custom-made smart phone applications can detect. With this example embodiment, the machine detected undisturbed presence of the not readily apparent to the human eye Benday pattern provides a very high level of confidence that the instant lottery ticket has not be altered, copied, and is in fact the original document for forensic analysis.

In various such embodiments of the present disclosure, the not readily apparent to the human eye imaged Benday pattern is implemented with digitally imaged UV fluorescence ink that only becomes visible under the proper UV illumination. With these embodiments, the UV detected undisturbed presence of the Benday pattern provides a high level of confidence that the instant lottery ticket has not be altered, copied, and is in fact the original document for forensic analysis.

In various embodiments, the above referenced countermeasures (that are further described below) to ticket alteration attacks can be implemented using the same imagers that are already deployed for printing the instant lottery ticket's variable indicia. The utilization of the imagers to print both variable indicia and Benday patterns and/or imaged backgrounds provides a more secure, less expensive, and more aesthetically pleasing ticket design then has been previously possible.

Various embodiments and advantages of the present disclosure are further set forth in the following description, or may be apparent from the present description, or may be learned through practice of the present disclosure. Described herein are also example printing mechanisms and methodologies that provide practical details for reliably producing digitally imaged Benday patterns that are highly resistant to cut and paste forgery attacks for SOC protected documents.

For example, FIGS. 2A thru 2G illustrate various different example embodiments of different countermeasures (for documents such as instant lottery tickets) to cut and paste forgery attacks for process color documents such as instant lottery tickets for a lottery game in accordance with various embodiments of the present disclosure. FIG. 2A illustrates three different exemplary digitally imaged multicolor Benday patterns of example instant lottery tickets. FIG. 2B illustrates a plurality of different exemplary multicolor Benday patterns superimposed over different colored backgrounds that can be employed on instant lottery tickets. FIG. 2C illustrates an example of an instant lottery ticket with its indicia imaged over three different colored imaged backgrounds thereby providing a possibly more aesthetically pleasing functional equivalent of a Benday pattern. FIG. 2D illustrates an example instant lottery ticket with imaged variable indicia over different colored imaged backgrounds, but with a much greater variance over the background color since each indicium is placed over its own isolated background color. FIG. 2E illustrates two imaged background patterns with two different colored perspectives of two example instant lottery tickets that increase variance by both the imaged background pattern and the color. FIG. 2F illustrates a digitally imaged instant lottery ticket where the variance in the background is accomplished by rotating the imaged background example star field from ticket-to-ticket. FIG. 2G illustrates three different views of the same digitally imaged instant lottery ticket including one view showing how the ticket would appear normally to a consumer with the other two views illustrating how a photocopy of the same ticket would appear revealing a previously concealed Benday pattern, thereby providing surreptitious countermeasures to both cut and paste as well as forgery attacks.

More specifically, as shown in FIG. 2A, the exemplary "Holiday Winnings" instant lottery tickets 200, 201, and 202 illustrate different exemplary Benday patterns printed on the substrates of the instant lottery tickets 200, 201, and 202 with a process color digital imager and with no variable indicia for illustrative purposes. The exemplary tickets 200, 201, and 202 show four different digitally imaged process color Benday patterns 203, 207, 208, and 209. As a practical matter, a virtually unlimited quantity of different Benday patterns are possible in accordance with this embodiment by varying the numerical inputs to the mathematical algorithm that plots the Benday patterns on a X/Y grid that coincides with the scratch-off area of the respective instant lottery ticket. The digitally imaged Benday pattern of instant lottery ticket 200 is shown plotted with three different process colors including orange 204, green 205, and purple 206. However, many other different color variations in association with such different Benday patterns are also possible in accordance with the present disclosure. For example, FIG. 2B depicts representative examples of sixteen different process color Benday patterns 210 thru 225 that can be employed on instant lottery tickets in accordance with the present disclosure. The Benday patterns 210, 211, 212, 213, 214, 215, 216, 217, 222, 223, 224, and 225 are overlayed on different solid color backgrounds and the Benday patterns 218, 219, 220, and 221 are overlayed on different gradient backgrounds.

FIG. 2C illustrates a representative example of an instant lottery ticket 230 with three different color imaged backgrounds surrounding the variable indicia 231, 232, and 233. In this example embodiment, by digitally imaging variable indicia over different colored backgrounds, anyone attempting a cut and paste attack must find a donor losing instant lottery ticket with the desired variable indicum printed over the same respective colored imaged background(s). These different colored backgrounds essentially replicate the countermeasure security of Benday patterns without the disadvantage of what some players may consider to be unattractive and/or confusing lines in the background. The present disclosure contemplates that using process color digital imagers the colored imaged background can be varied as much as desired from ticket to ticket for the same lottery game, the larger variety of varying color imaged background countermeasure can become more secure than traditional Benday patterns. This varying of background color from ticket-to-ticket need not necessarily be profound with subtle differences in the hue or shade of background colors from ticket-to-ticket of the same lottery game appearing to be similar when causally viewed by a consumer but become readily apparent when an indicum is taken from a donor losing instant lottery ticket in an attempt to create an apparently winning instant lottery ticket.

Thus, if a sufficient quantity of different digitally imaged colored background areas surrounding variable indicia are printed from ticket-to-ticket for the same lottery game, the effective security against cut and paste attacks can be provided with the added advantage of enhanced esthetics without the disadvantages inherent in the Benday plate printing process. The present disclosure contemplates that a sufficient quantity of different digitally imaged colored background areas on instant lottery tickets of a lottery game can be employed to achieve cut and paste fraud security.

As previously discussed, known Benday patterns are plate printed that are wrapped around print cylinders typically ranging 12 to 30 inches in circumference. Since known Benday patterns repeat after every revolution of the print cylinder, the best-case variability of known Benday patterns would be achieved with 30 inch circumference cylinders. One best case Benday pattern variability example would be realized by printing the known ticket 101 of FIG. 1A, which is 3 inches high, therefore allowing for ten tickets to be printed with potentially different Benday patterns on a 30 inch cylinder before repeating Benday patterns. However, shorter instant lottery tickets like the example ticket 101 typically sell for less money (such as one Euro in this example) than larger tickets. As ticket retail prices increase, the lottery industry has generally adopted the strategy to increase the actual physical ticket size accordingly to denote higher retail value. For example, $5 (and higher) retail tickets placed on sale commonly are 6 to 8 inches in height with some examples being as tall as 12 inches in height. So, assuming an example of an 8 inch tall ticket on a 24 inch circumference cylinder, the quantity of unique Benday patterns before repeating would be three. Thus, known plate printed Benday pattern security has the unaccommodating tendency to decrease as the retail value of the instant lottery ticket increases.

Returning to the example instant lottery ticket 230 of FIG. 2C, the three different colored backgrounds 231, 232, and 233 can be viewed as providing approximately the same level of security as traditional plate printed Benday patterns for 8 inch high instant lottery tickets with three different patterns. The embodiment adds background Benday patterns to add the variance of "locationality" (i.e., the Benday lines behind an indicum in one area of the instant lottery ticket will not necessarily match the lines behind an indica on another area of the instant lottery ticket). With the solid color background patterns 231, 232, and 233 in the example of FIG. 2C, the locationality would be confined to the three different colored areas 231, 232, and 233. As shown in FIG. 2C, the ticket layout 230 includes twelve different rows by three different columns of indicia on the substrate of the instant lottery ticket, and thus thirty-six different locations.

With the use of digital imaging in accordance with the present disclosure, the creation of one hundred and eight different background colors for tickets in an instant game can be employed. In the example instant lottery ticket 230 of FIG. 2C, the processor that generates the imager files can be programmed to alter the three different background colored areas 231, 232, and 233 per ticket over thirty-six different tickets. However, this does not necessarily mean that the thirty-six different background colored tickets must appear substantially different from each other. With plus-or-minus minor variations of the percentage of CMYK ink with each component color or combination (e.g., ≤4% black,≤7% cyan and magenta, ≤13% yellow) used to produce the process background colors, subtle background color changes from ticket-to-ticket can be achieved. Similar colors can be quantified by first plotting a given process color as a point on a color gamut and then defining a circle on the color gamut of limited radius with its center the plotted point of the given color—i.e., a color gamut graphically shows the subset of process colors which can be accurately produced by a given printer (e.g., CMYK printer), thereby illustrating the printer's color space or range of colors that can be actually reproduce with adjacent or near points on the gamut constituting similar colors.

For example, the magnified dice indicum 234 has four different example subtle background colors 226, 227, 228, and 229, which would not necessarily be apparent when comparing one ticket to another ticket but become readily apparent when the background colors are place adjacent to each other on the same ticket. The present disclosure contemplates that such subtle background color changes from ticket-to-ticket are not necessarily apparent to a casual observer but become readily apparent when cutout and placed into another ticket such that the different colors are placed next to each other, thus increasing the effectiveness of this cut and paste countermeasure.

In various embodiments, this varying color imaged background can be further expanded by varying the colors behind each variable indicium individually, as shown in FIG. 2D. With the exemplary "Cleopatra" instant lottery ticket 235 of FIG. 2D, any given variable indicum can be imaged with a large plurality of different colored imaged backgrounds. For example, the variable indicium symbols "9" and "A" are imaged with yellow backgrounds 235 and 237 for the "9" and "A" respectively, blue backgrounds 238, 239, and 245 for the “9” and 236 and 246 for the “A” symbols, orange backgrounds 244 for the “9” and 241 for the “A”, and a red background 243 for the “A”. Thus, with this embodiment, the large quantity of different colored backgrounds that are available for each variable indicum greatly increases the variance and consequently increases the complexity of a successful cut and paste attack and is a countermeasure for such attacks.

In various embodiments, the variable indicia imaged backgrounds on the instant lottery tickets are solid or blended colors. In various other embodiments, the variable indicia imaged backgrounds on the instant lottery tickets are not limited to solid or blended colors. For example, FIG. 2E depicts two representative examples of instant lottery tickets 250 and 251 with the same distribution of variable indicia 256 and 257 printed over two different colored imaged backgrounds 254 and 255 that include an embedded translucent graphical representation of a multicolored joker's face 252 and 253. With this example it is apparent that the same variable indicium 256 and 257 from one exemplary donor ticket 250 cannot be successfully cut and pasted into a second exemplary recipient ticket 251, since the immediate area background colors surrounding the variable indicia are different. In various embodiments, the addition of the graphical representation (such as the joker's face 252 and 253) of the imaged background also further restricts cut and paste donor indicum to only instant lottery tickets with the same colored background with the required indicum in the same X/Y grid location in the scratch-off area. Such embodiments provide a large quantity of permutations and consequently complexity associated with finding the correct candidate donor indicium with the same colored background that is also in the appropriate X/Y grid location position requirements and greatly exceed the quantity of permutations created by traditional known plate printed Benday patterns and consequently become a more secure countermeasure to cut and paste attacks.

Various embodiments of the present disclosure provide that the multicolored imaged background patterns with embedded graphical representations (functioning as a more complex and possibly more esthetically pleasing Benday pattern) can be further enhanced by rotating or realigning the embedded imaged background patterns on different instant lottery tickets of a lottery game. For example, FIG. 2F depicts a representative example of an instant lottery ticket 260 with variable indicia 262 over a low contrast star field background imaged background 261. In this example embodiment, multiple copies of the star field imaged background 261 are rotated at least 15° from each other as shown in the different patterns 263 thru 267 thereby changing the imaged background in terms of star positioning on the X/Y grid without having to modify the artwork itself. In various embodiments, to be effective as a countermeasure to cut and paste attacks, a background pattern that is incrementally rotated from ticket-to-ticket to achieve greater variance should also exhibit rotational anisotropy to ensure that the incremental rotations imaged in the various tickets' backgrounds provide a human observable difference in regard to the background orientation relative to the variable indicia.

Thus, the pseudo randomly rotated star field imaged background of this example embodiment also functions as a potentially more esthetically pleasing Benday pattern countermeasure to cut and paste attacks since a donor indicium must be selected from a certain position with the identically rotated star field in the imaged background. If the imaged background star field rotations are selected on a pseudorandom rather than a periodic basis (as would be for plate printed Benday patterns), the garnering of desired indicia from losing instant lottery tickets becomes more difficult because of the lack of predictability due to the pseudorandom distribution. The present disclosure contemplates that pseudorandom selection process of imaged background rotation can be applied to other forms of imaged backgrounds and/or colors (e.g., FIGS. 2A thru 2E) and is not necessarily restricted to different rotational variations. The present disclosure also contemplates that achieving greater variation utilizing one Benday and/or imaged background pattern by rotation can be expanded to include: (a) mirroring of one or more Benday and/or imaged background patterns about the vertical and/or horizontal axis (or other angle); (b) positionally floating the Benday and/or imaged background pattern on the X/Y grid such that the Benday and/or imaged background pattern is in a different background orientation relative to the indicia; or (c) a suitable combination of the rotation, mirroring, or floating to achieve greater variation.

In addition to unique Benday, color, and imaged background pattern cut and paste countermeasures imaged behind the variable indicia that are visible to the consumer, various embodiments of the present disclosure provides variable Benday and imaged background patterns on instant lottery tickets that can be imaged and that are not visible to the consumer under normal (white light) illumination when seen by the unaided human eye. For example, FIG. 2G illustrates an example lottery ticket 270 as it would normally appear to a consumer with variable indicia 273 imaged over a patterned imaged background 279. Also shown in FIG. 2G are two different images of the same ticket 271 and 272 as they would appear if the ticket was photocopied with a Benday pattern 276 appearing behind the variable indicia 274 of ticket image 271 and a Benday pattern 277 appearing behind and on top 278 of the variable indicia 275 of ticket image 272. While this embodiment of not readily apparent to the human eye imaged Benday patterns 276 and 277 provides an added countermeasure to cut and paste attacks (i.e., it is unlikely that an illicit perpetrator of a ticket alteration attack would be aware of the hidden Benday pattern), this embodiment has the added advantage of also deterring forgeries since any attempt to copy the instant lottery ticket will alter the appearance of the copy from the pristine original appearance.

With the embodiment of FIG. 2G, the not readily apparent to the human eye imaged Benday pattern can be implemented via a “void pantograph” that, via steganography, prints extra information in the ticket's scratch-off area that is only apparent when the document is copied, but not apparent when viewed by the unaided human eye. This void pantograph is made possible by printing a light-colored concealed Benday pattern with halftone screening that is manipulated to produce a dot pattern that is not apparent to the human eye, but that a wide range of scanners, copiers, as well as custom-made smart phone applications will detect. With this embodiment, the machine detected undisturbed presence of the stenographic Benday patterns 276 and 277 provide a very high level of confidence that the instant lottery ticket has not be altered, copied, and is in fact the original document during forensic analysis. Additionally, in various embodiments, by optionally continuing the not readily apparent to the human eye imaged Benday pattern over the variable indicia 278 additional cut and paste protection is provided that would not be practical with benday patterns that are visible to the unaided human eye (i.e., a visible Benday pattern imaged on top of variable indicia would at the very least detract from the attractiveness of the ticket design and possibly create confusion for the player).

In an alternative embodiment, the not readily apparent to the human eye void pantograph Benday patterns in the background of instant lottery tickets can be produced using printing plate technology instead of digital imagers (e.g., Flexographic, Gravure, Offset). However, with this embodiment, plate printing not readily apparent to the human eye void pantograph Benday patterns have the disadvantages of added press complexity and possibly creating interference with the primer for receiving ink jet indicia. Additionally, unlike digitally imaging not readily apparent to the human eye Benday patterns, plate printing print void pantograph Benday patterns would not be possible over the indicia.

Printing not readily apparent to the human eye Benday patterns utilizing the known void pantograph methodology is only one possible steganography technique for concealing Benday patterns in an imaged background and on the variable indicia. For example, not readily apparent to the human eye Benday patterns can also be imaged in the background in a pattern that only becomes apparent when viewed with a lenticular lens.

In various embodiments, the not readily apparent to the human eye imaged Benday pattern can be implemented with digitally imaged Ultraviolet (UV) fluorescence ink that only becomes visible under the proper UV illumination. With these embodiments, the UV detected undisturbed presence of the Benday pattern provides approximately the same level of confidence that the instant lottery ticket has not be altered, copied, and is in fact the original document during forensic analysis. Invisible UV fluorescence inks are dye based and can be applied either via a static printing plate or a digital imager. When invisible UV fluorescence inks are applied by an imager, typically the most cost-effective method is to apply the UV fluorescence ink by a spot color imager (e.g., 508 of FIG. 5) that is in-line with any process color imaging heads (e.g., CMYK heads 504 thru 507 of FIG. 5). However, in this type of application, the printed process colors will most likely not be fully cured if the spot color imager is placed in-line with the process color imaging heads and consequently the spot color dye-based UV ink will be applied on top of the not cured process color inks already applied to the ticket. Consequently, to better ensure uncured ink compatibility, the present disclosure contemplates that the process color inks can be pigmented based with the imaged UV Benday pattern overprint being dye based. This application of the UV Benday pattern via digital imaging immediately after the process colors have been printed can be implemented to print only Benday patterns in the background of the instant lottery ticket (as with traditional known UV plate printing) or, optionally, over both the background as well as the variable indicia.

Figure 3A:
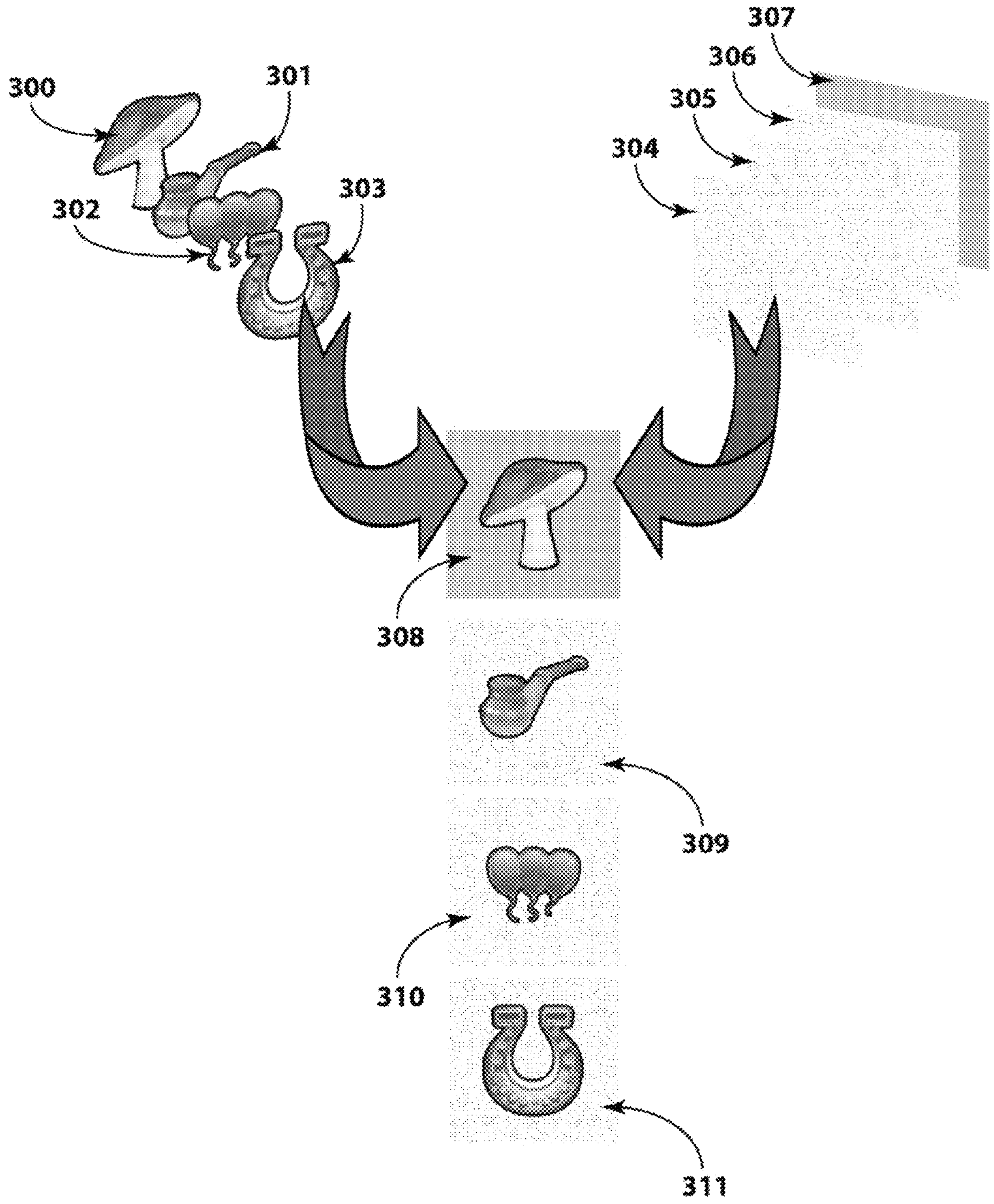
FIG. 3A illustrates a planar view of a representative example method of the present disclosure that includes combining the multiple color Benday patterns of FIGS. 2A and 2B with variable indicia and then flatting the resultant homogeneous combinations.
Figure 3B:
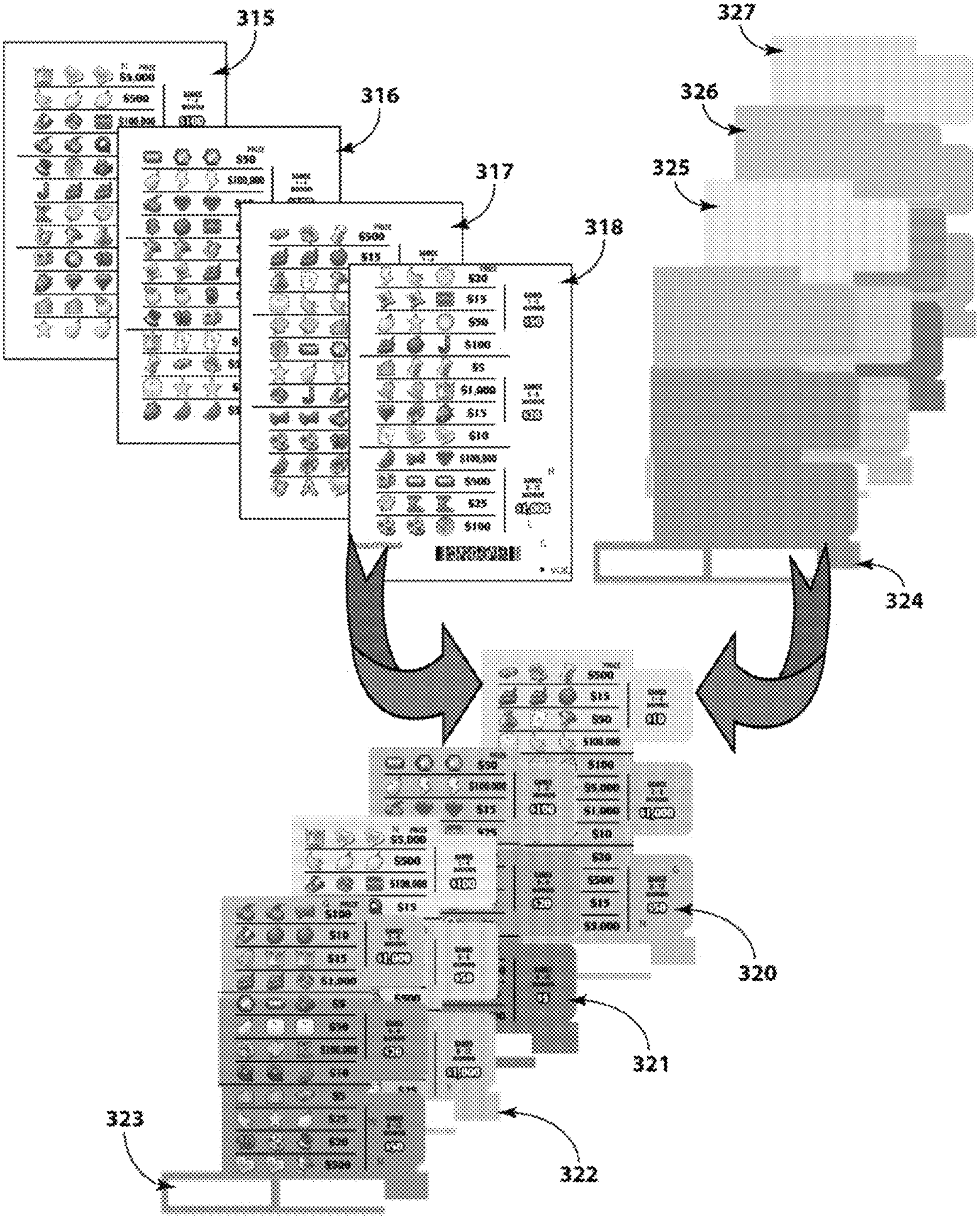
FIG. 3B illustrates a planar view of a representative example method of the present disclosure that includes combining the multiple color imaged background patterns and variable indicia of FIGS. 2C, 2D, and 2E and then flatting the resultant homogeneous combinations.
Figure 3C:
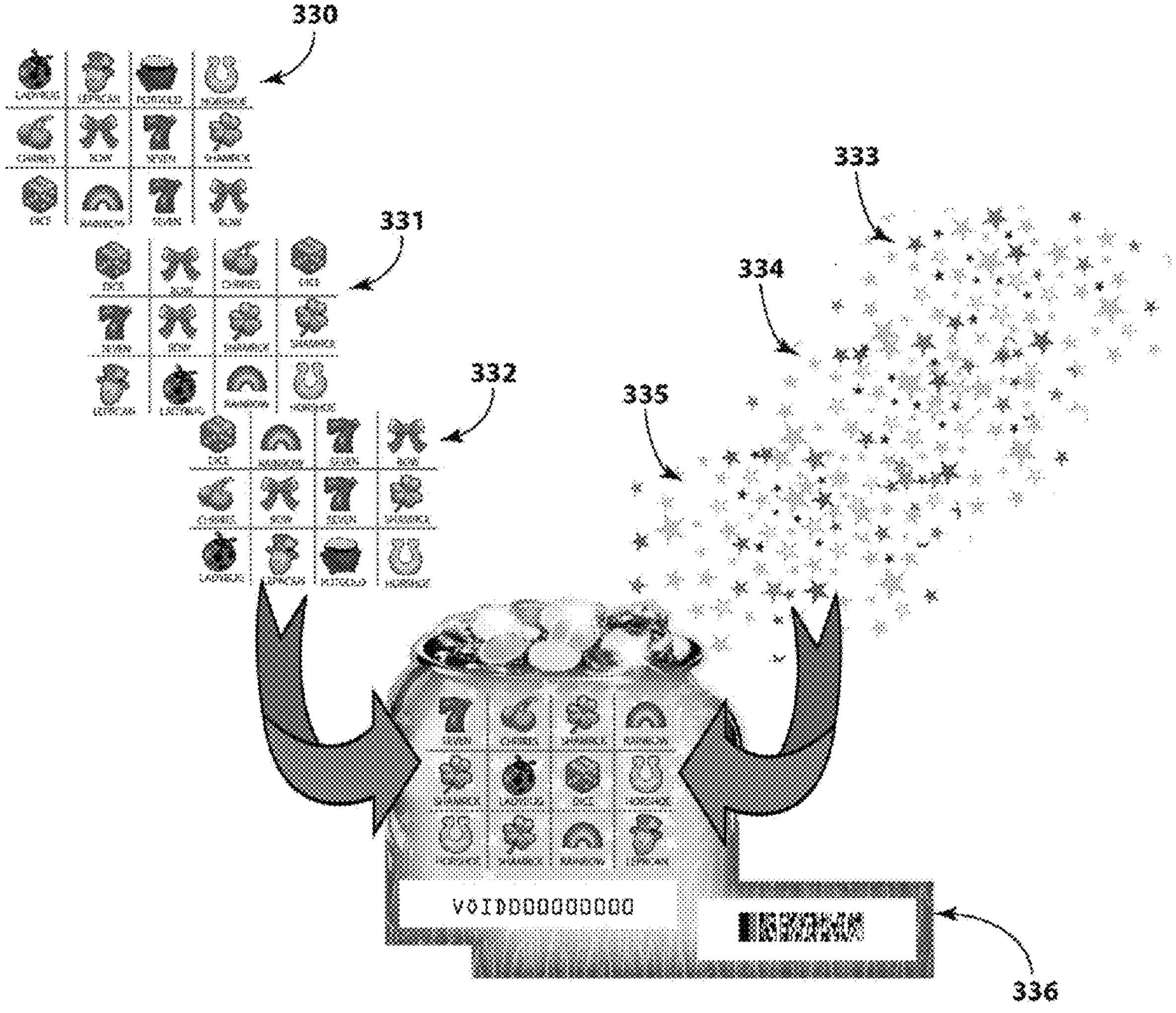
FIG. 3C illustrates a planar view of a representative example method of the present disclosure that includes combining the imaged background pattern and variable indicia of FIG. 2F with variance of the imaged background pattern achieved by rotation prior to flatting the resultant homogeneous combinations.
Figure 3D:
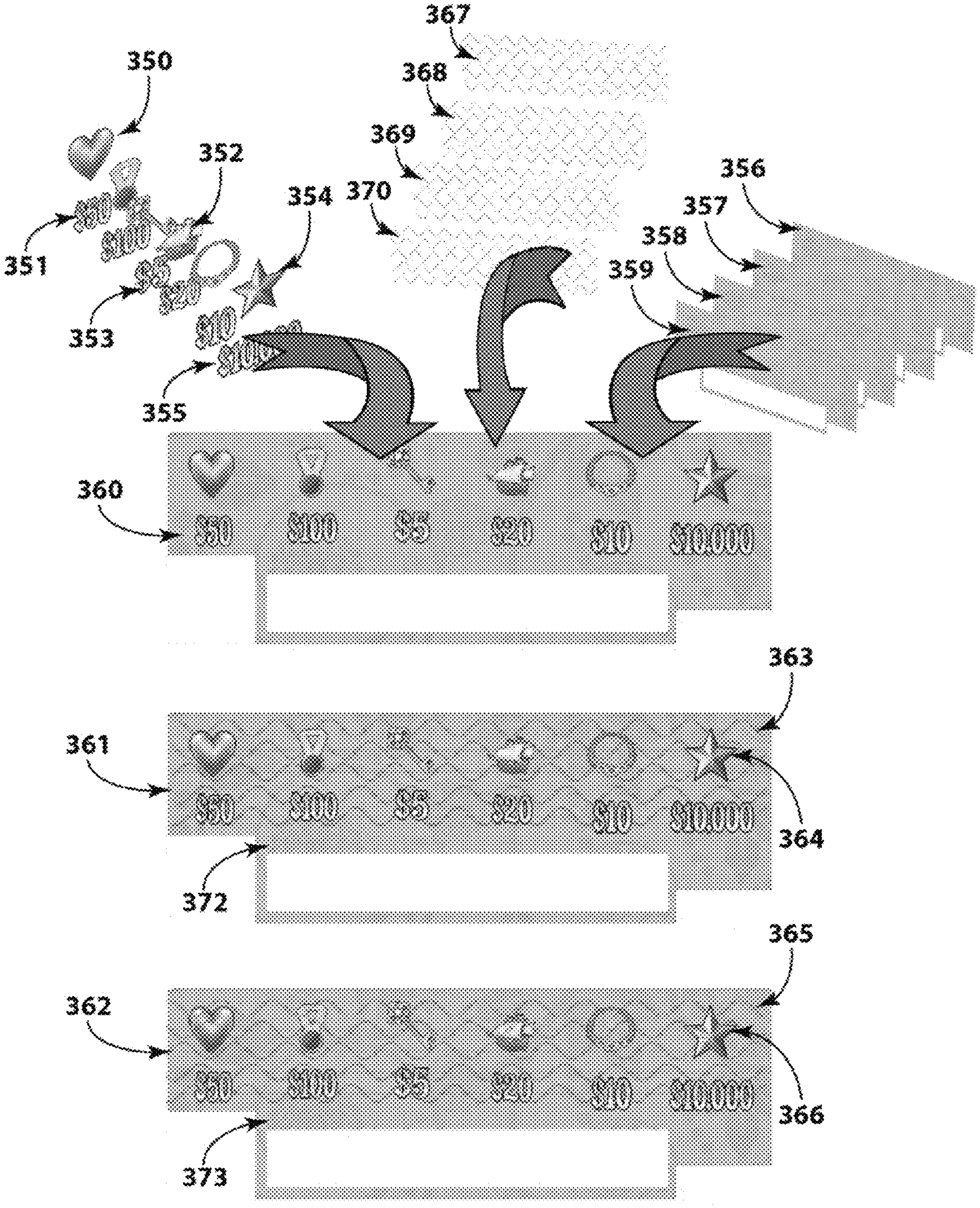
FIG. 3D illustrates a planar view of a representative example method of the present disclosure that includes combining various Benday patterns and variable indicia of FIG. 2G such that the Benday patterns are not apparent to the unaided human eye and then flatting the resultant homogeneous combinations.

FIGS. 3A, 3B, 3C, and 3D taken together show portions of the example instant lottery tickets of FIGS. 2B thru 2G that illustrate both the variable indicia as well as Benday and/or imaged background pattern images. FIG. 3A illustrates selected variable indicia being combined with a portion of the variable Benday patterns of FIG. 2B prior to imaging in accordance with example methods of the present disclosure. FIG. 3B illustrates the selected variable indicia for the ticket of FIG. 2C being combined with a multicolor imaged background (which would also be applicable to FIGS. 2D and 2E) in accordance with other example methods of the present disclosure. FIG. 3C illustrates selected variable indicia compatible with the ticket embodiment of FIG. 2F being combined with a single imaged background that is rotated multiple times to achieve imaged background variety in accordance with other example methods of the present disclosure. FIG. 3D illustrates the variable indicia and static imaged background of the ticket of FIG. 2G being combined with variable Benday patterns that are either printed as a second layer of imaged background behind the variable indicia or as an overprint for both the imaged background and the variable indicia, in accordance with other example methods of the present disclosure.

More specifically, FIG. 3A illustrates a series of selected indicia 300, 301, 302, and 303 with each indicium from the selected series being paired to a different Benday background 304, 305, 306, and 307 and then "flattened" into various digital combinations 308 thru 311. Flattening the discrete digital indicia and Benday patterns into homogeneous planes is accomplished by condensing all the discrete image layers (e.g., variable indicum layer and Benday background layer) into a single layered combination image. Flattening the discrete image layers significantly reduces the file size, making it easier to print the image with a RIP (Raster Image Processor). Sending a file with multiple layers to a RIP takes longer to transmit and process because each layer is essentially an individual image, which drastically increases the amount of data that must be processed. Thus, by first selecting separate digital images of the variable indicia and the Benday patterns and then flattening the selections, the system and method of the present disclosure maintains its ability to select variable indicia and pair the selected indicia to different varying Benday patterns with sufficient variety to ensure countermeasures to cut and paste attacks with the additional benefit of faster and more efficient RIP processing.

The present disclosure contemplates that the method of first selecting the variable indicia and background Benday pattern(s) for a given ticket and then flattening the composite can be extended to digital imaged backgrounds. For example, FIG. 3B illustrates four different sets of selected variable indicia 315, 316, 317, and 318 that are already arranged on the X/Y grid to be compatible with the ticket layout of FIG. 2C that are then matched to subtlety varying multicolor imaged backgrounds 324, 325, 326, and 327 (shown in FIG. 3B) resulting in four flattened images 320, 321, 322, and 323. Thus, the example embodiment shown in FIG. 3B, includes a plurality of imaged backgrounds 324, 325, 326, and 327 providing the variety necessary to provide a countermeasure to a cut and paste attack (as effective as classic Benday patterns), and specifically including three different colored bands of the imaged backgrounds and subtle differences in the imaged background colors from ticket-to-ticket. This prevents an indicum that appears over one colored background from being used as a donor indicum for a different colored background in a cut and paste attack. The present disclosure further contemplates that the multicolored imaged backgrounds can be further confined to the immediate background around each indicum (e.g., FIG. 2D) to greatly increase the variety and consequently make a cut and paste attack more difficult. The present disclosure further contemplates that the variety of the imaged background can also be increased by making the colors of the imaged background bands of FIG. 3D vary (either obviously or subtly) from ticket-to-ticket. The present disclosure still further contemplates varying the imaged backgrounds across the X/Y grid can be further enhanced by including low contrast detailed illustrations in the imaged backgrounds (e.g., FIG. 2E) that identify the specific locations behind each indicum depending on where it is positioned (e.g., an indicum imaged over a portion of the Joker's hat could not be used as a donor indicum over the Joker's face in FIG. 2E). The variety of detailed illustrated imaged background can be further increased by also varying the color tint from ticket-to-ticket in accordance with the present disclosure.

The present disclosure contemplates that varying Benday patterns and/or imaged backgrounds is not the only way to provide countermeasures to cut and paste attacks (equivalent to or better than traditional plate printed Benday patterns). In alternative embodiments, a single detailed imaged background pattern can be rotated from ticket-to-ticket to achieve sufficient variety to ensure protection from cut and paste attacks. For example, FIG. 3C illustrates three different sets of selected variable indicia 330, 331, and 332 besides the detailed star pattern from FIG. 2F with the imaged background shown in three different rotational orientations 333, 334, and 335 of FIG. 3C. As indicated above, the three different sets of selected indicia 330, 331, and 332 are already arranged on the X/Y grid to be compatible with the ticket layout of FIG. 2F with each set matched to one of the rotated detailed imaged background patterns 333, 334, and 335 of FIG. 3C with the combined selection flatten into a combined homogeneous image 336. Thus, by incrementally rotating the detailed imaged background such as in a periodic or pseudorandom manner from ticket-to-ticket, sufficient variety of the variable indicia background is achieved to function as a cut and paste countermeasure. This embodiment has the advantages of a simplified configuration of potentially complex imaged background art as well as generating similar appearing tickets to a casual observer. This embodiment can be limited to detailed imaged backgrounds exhibiting informational rotational isotropy such that the imaged background can be rotated an arbitrary quantity of degrees with no loss of visual information or perceived abnormalities.

All the previous embodiments disclose variable Benday patterns and/or imaged backgrounds that are visible to the consumer and retailer after the instant lottery ticket is played. In alternative embodiments, digitally imaged Benday patterns and/or imaged backgrounds can be imaged in the areas behind and/or on top of the variable indicia such that the imaged Benday pattern is not apparent to an unaided human eye perceiving the ticket but becomes readily apparent when viewed with the aid of a device. This alternative embodiment is particularly suited for forensic examination of an apparent winning instant lottery ticket where the illicit perpetrator of a ticket alteration or forgery attack would likely be unaware of the hidden Benday pattern.

For example, FIG. 3D illustrates not readily apparent to the human eye imaged Benday patterns implemented via a void pantograph that, via steganography, includes printed extra information in the ticket's scratch-off area that is only apparent when the document is copied as shown by images 361 and 362, but not apparent when viewed by the unaided human eye as shown by image 360. This void pantograph is made possible by printing a light-colored concealed Benday pattern with halftone screening that is manipulated to produce a dot pattern that is not apparent to the human eye (but that can be detected via a wide range of scanners, copiers, as well as custom-made smart phone applications). Alternatively, void pantograph generation can also be achieved via differing lines per inch lines screens applied to the same background pattern, or by varying thickness of lines and/or angles, etc. Regardless of the methodology employed to form void pantographs, with this embodiment the machine detected undisturbed presence of the stenographic Benday pattern provide a very high level of confidence that the instant lottery ticket has not be altered or copied and is in fact the original document for forensic analysis.

As shown in FIG. 3D, there are six different selected variable indicia 350, 351, 352, 353, 354, and 355, four different sets of imaged backgrounds 356, 357, 358, and 359, and four different Benday patterns 367, 368, 369, and 370 that are all compatible with the example of FIG. 2G. As before, the selected indicia 350, 351, 352, 353, 354 and 355 and the sets of imaged backgrounds 356, 357, 358, and 359 are combined and flattened 360 into a homogeneous image. In various embodiments shown by image 361, the imaged background 372 also includes an embedded not readily apparent to the human eye imaged void pantograph variable Benday pattern 363 that would only be visible if the original ticket were copied such as shown by image 361. With these particular embodiments, since the imaged background 372 includes an embedded not readily apparent to the human eye imaged void pantograph variable Benday pattern 363, the selected variable indicia 364 will obscure the portions of the not readily apparent to the human eye Benday pattern 363 where it overlaps the imaged background 372 as a byproduct of the flattening process. Alternatively, in other embodiments shown by image 362, the imaged background 373 does not include an embedded not readily apparent to the human eye imaged void pantograph variable Benday pattern; but rather includes a selected Benday pattern 365 flattened on the imaged background 373 and variable indicia 366 composite image that create a not readily apparent to the human eye imaged void pantograph variable Benday pattern that appears both on the imaged background 373 and the variable indicia 366 when photocopied as shown by image 362.

The present disclosure contemplates that the not readily apparent to the human eye imaged Benday patterns 363 and 365 can also be printed with digitally imaged UV fluorescence ink that is normally invisible to the unaided human eye, only becoming visible with the proper UV illumination. Invisible UV fluorescence inks are dye based and can be applied either via a static printing plate or a digital imager. When invisible UV fluorescence inks are applied by an imager, typically the most cost-effective method is to apply the UV fluorescence ink via a spot color imager (e.g., 508 of FIG. 5) that is in-line with any process color imaging heads (e.g., CMYK heads 504, 505, 506, and 507 of FIG. 5). However, in this type of application, the printed process colors will most likely not be fully cured since the spot color imager is placed in-line with the process color imaging heads and consequently the spot color dye-based UV ink will be applied on top of the not fully cured process color inks already applied to the ticket. Generally, a dye-based UV overprint ink film will exhibit excessive bleed or blurring when applied over dye-based process color inks and therefore most likely produce undesirable images. Accordingly, the present disclosure provides a better method of applying a dye-based UV fluorescence ink over uncured process colors is to ensure that the process colors are pigmented based, thereby reducing the tendency of the dye-based UV overprint to bleed or blur. In an alternate embodiment, if the printing press is configured to ensure that the process color images are completely cured before the dye-based UV overprint application, the underlying process colors can be either pigmented or dye based.

Figure 4A:
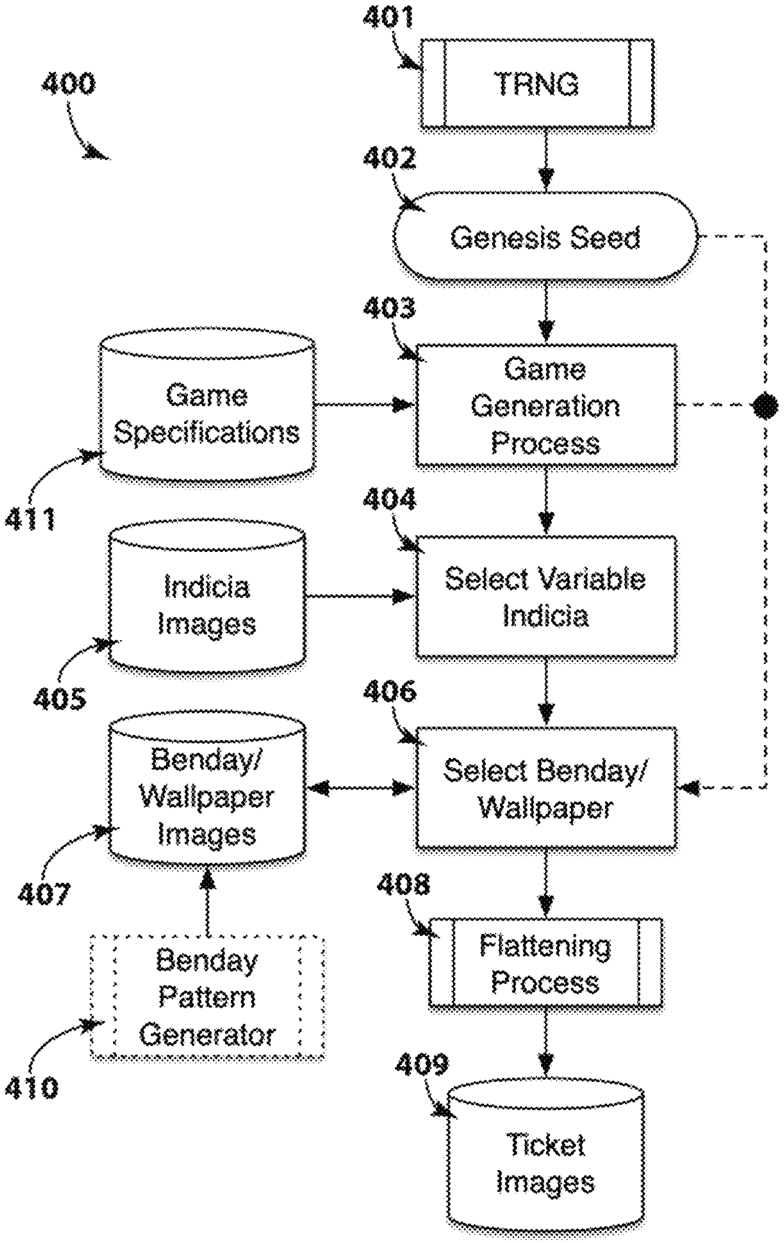
FIG. 4A illustrates an overall block diagram of a representative example system and method of the present disclosure showing a schematic graphical overview for generating instant lottery tickets with digitally imaged variable Benday patterns compatible with FIGS. 2A thru 2E.

FIG. 4A illustrates an example method (and system) 400 for creating the exemplary instant lottery tickets of FIGS. 2A thru 2E. This method includes accessing or obtaining a plurality of already generated Benday and/or imaged background patterns and storing the acquired Benday and/or imaged background patterns in a database 407 (FIG. 4A). Additionally, this method optionally includes algorithmically generating Benday patterns 410 by a designated function and storing the generated Benday patterns 410 in a database 407. The stored Benday and/or imaged background patterns are then combined with previously chosen variable indicia 404 with the combined indicia and patterns ultimately flattened 408 as a group or on a ticket-by-ticket basis before being stored 409 for printing instant lottery tickets.

More specifically, the method and system of FIG. 4A begins with the creation of a Genesis Seed 402 that functions as a starting point for a deterministic game engine 403 that ultimately yields a sequence of pseudo-randomized indicia (selected from a pool of possible indicia 405) that are also arranged to comply with the specifications 411 of the instant lottery ticket game being generated. The Genesis Seed 402 can be a large binary number (e.g., 256 bits, 512 bits) created by a Random Number Generator (RNG) or alternatively a True Random Number Generator (TRNG) 401.

The variable indicia for a given ticket are selected 404 from a pool of all possible different indicia for a given game 405. The selected variable indicia and possibly the arrangement of the selected variable indica 404 are determined by whether a given ticket is a winner or not, and if it is a winner, what prize should be awarded as driven by the Genesis Seed 402. Once the winning status of a given ticket and its associated variable indicia have been selected 404, a background Benday and/or imaged background pattern is/are selected 406 from a pool of different possible Benday and/or imaged background patterns 407. The selection process 404 of Benday and/or imaged background patterns 407 can vary from game-to-game, with different games requiring: (1) a single Benday or imaged background pattern, (2) a simple periodic distribution of a plurality of Benday and/or imaged background patterns, (3) a pseudorandom selection of a plurality of Benday and/or imaged background patterns driven by the Genesis Seed 402, or (4) a plurality of Benday and/or imaged background patterns as determined by the Game Generation Process 403 in compliance with the Game Specifications 411, etc.

Regardless of the Benday and/or imaged background pattern selection process, the selected indicia and the Benday and/or imaged background pattern are processed by the system as separate image layers (such as the indicia layer on top of the Benday and/or imaged background layer) with the two separate image layers flattened 408 into a single layer or frame. These layers or frames can be converted to at least one format that is compatible with an on-press Raster Image Processor (RIP) such as Portable Network Graphics or “PNG”, Joint Photographer’s Expert Group or “JEPG”, Tag Image File Format or “TIFF”, etc. before being saved in non-volatile memory 409 for printing in the future.

Optionally, a separate algorithmic process can be employed to create a series of different Benday patterns 410 that can be stored in a pool 407 for future selection. By utilizing an algorithmic process to create different Benday patterns, a very large quantity of unique Benday patterns can be created greatly increasing the effectiveness of the Benday cut and paste countermeasure in accordance with the present disclosure. For example, every instant lottery ticket in a game could be printed with its own unique Benday pattern. The actual function to generate Benday patterns can vary but can be a common mathematical function (e.g., sine waves with varying phase, frequency, and amplitude; phase coded waveforms; complex sinusoids; etc.) that produces a unique line pattern when plotted on an X/Y grid that coincide with the scratch-off area of an instant lottery ticket and can easily be varied.

By algorithmically generating background Benday patterns 410 it becomes possible to create unique Benday patterns for every instant lottery ticket in a game (or alternatively a very large quantity of instant lottery tickets in a game) that are pseudo randomly distributed such that it is not apparent when the Benday patterns will repeat. Thus, in this embodiment, a database 407 can be maintained logging which specific Benday pattern was printed on a given instant lottery ticket in a game thereby effectively creating and documenting a “fingerprint” for each printed instant lottery ticket.

Figure 4B:
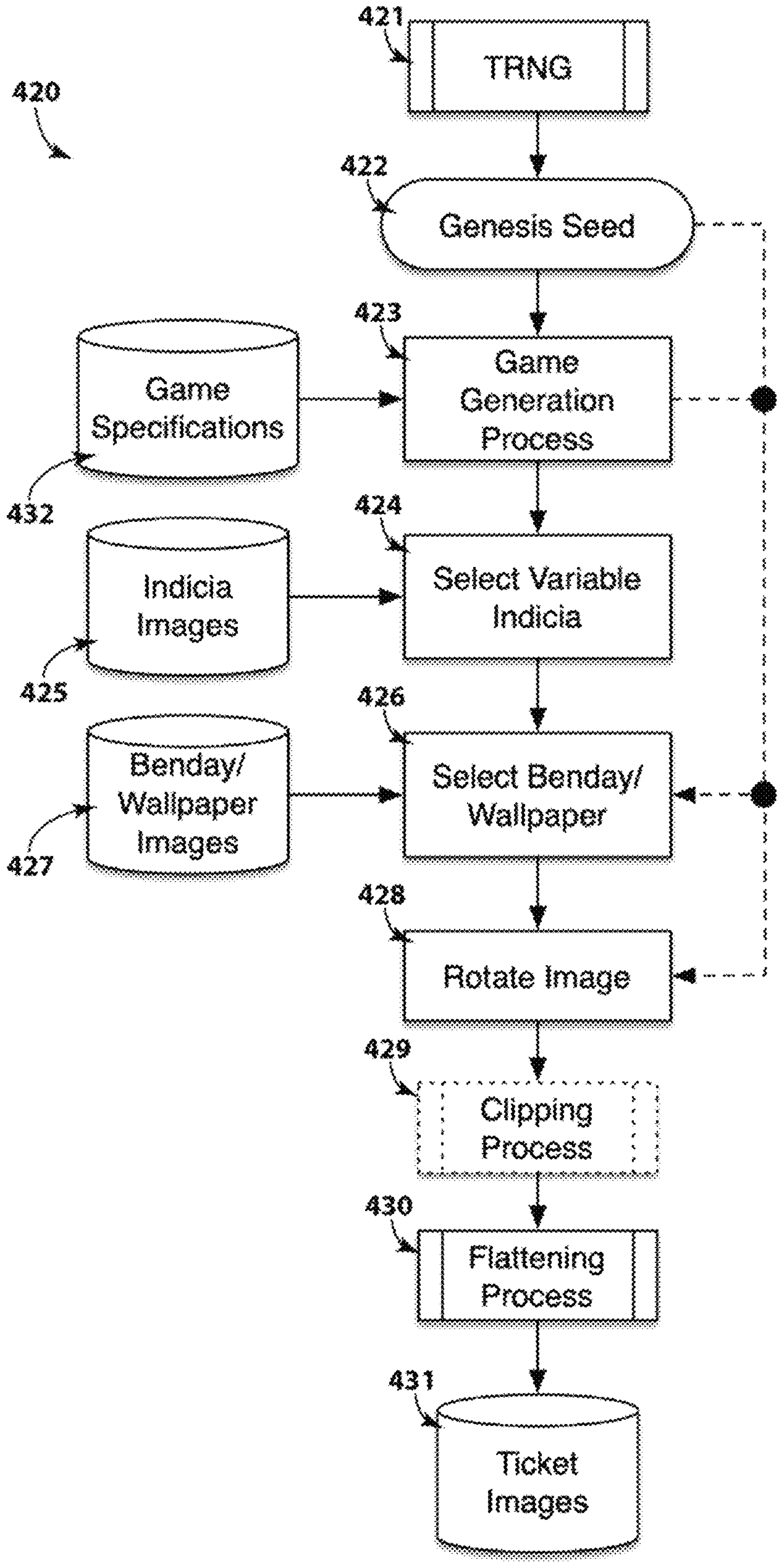
FIG. 4B illustrates an overall block diagram of another representative example system and method of the present disclosure showing a schematic graphical overview for generating instant lottery tickets with digitally imaged background variable patterns compatible with FIG. 2F.

FIG. 4B illustrates an alternative exemplary method and system 420 for creating the example instant lottery tickets of FIG. 2F. As before, this method includes accessing or obtaining a plurality of already generated Benday and/or imaged background pattern(s) and storing the acquired Benday and/or imaged background patterns in a database 427 (FIG. 4B). The stored Benday and/or imaged background pattern(s) are then rotated 428 and optionally clipped or cropped 429 before being combined with previously chosen variable indicia 424 with the combined indicia and patterns ultimately flattened 430 as a group or on a ticket-by-ticket basis before being stored 431 for printing instant lottery tickets.

The method and system of FIG. 4B begins with the creation of a Genesis Seed 422 (optionally created by a TRNG 421) that functions as a starting point for a deterministic game engine 423 to yield a sequence of pseudo-randomized indicia (selected from a pool of possible indicia 425) that are also arranged to comply with the specifications 432 of the instant lottery ticket game being generated. The variable indicia for a given ticket are selected 424 from a pool of all possible different indicia for a given game 425. The selected variable indicia are determined by whether a given instant lottery ticket is a winner or not, and if it is a winner, what prize should be awarded which are ultimately driven by the Genesis Seed 422.

Once the winning status of a given ticket and its associated variable indicia have been selected 424, a background Benday and/or imaged background pattern is/are selected 426 from a pool of possible Benday and/or imaged background patterns 427. The selection process 424 of Benday and/or imaged background patterns 427 can vary from game-to-game. Regardless of the Benday and/or imaged background pattern selection process, in this embodiment, the selected pattern is then rotated 428 a specified quantity of degrees to increase the background variety and consequently enhance the immunity to cut and paste attacks. The exact amount of rotation (if any) of a given Benday and/or imaged background pattern on each ticket can vary from game-to-game (e.g., amount, periodic, pseudorandom driven by the Genesis Seed 422, controlled by the Game Generation Process 423). In various embodiments, if portions of the resultant rotated pattern exceed the scratch-off area of the ticket, those portions of the pattern outside the scratch-off area can be optionally cropped or clipped 429 before being flattened 430 and saved 431.

Figure 4C:
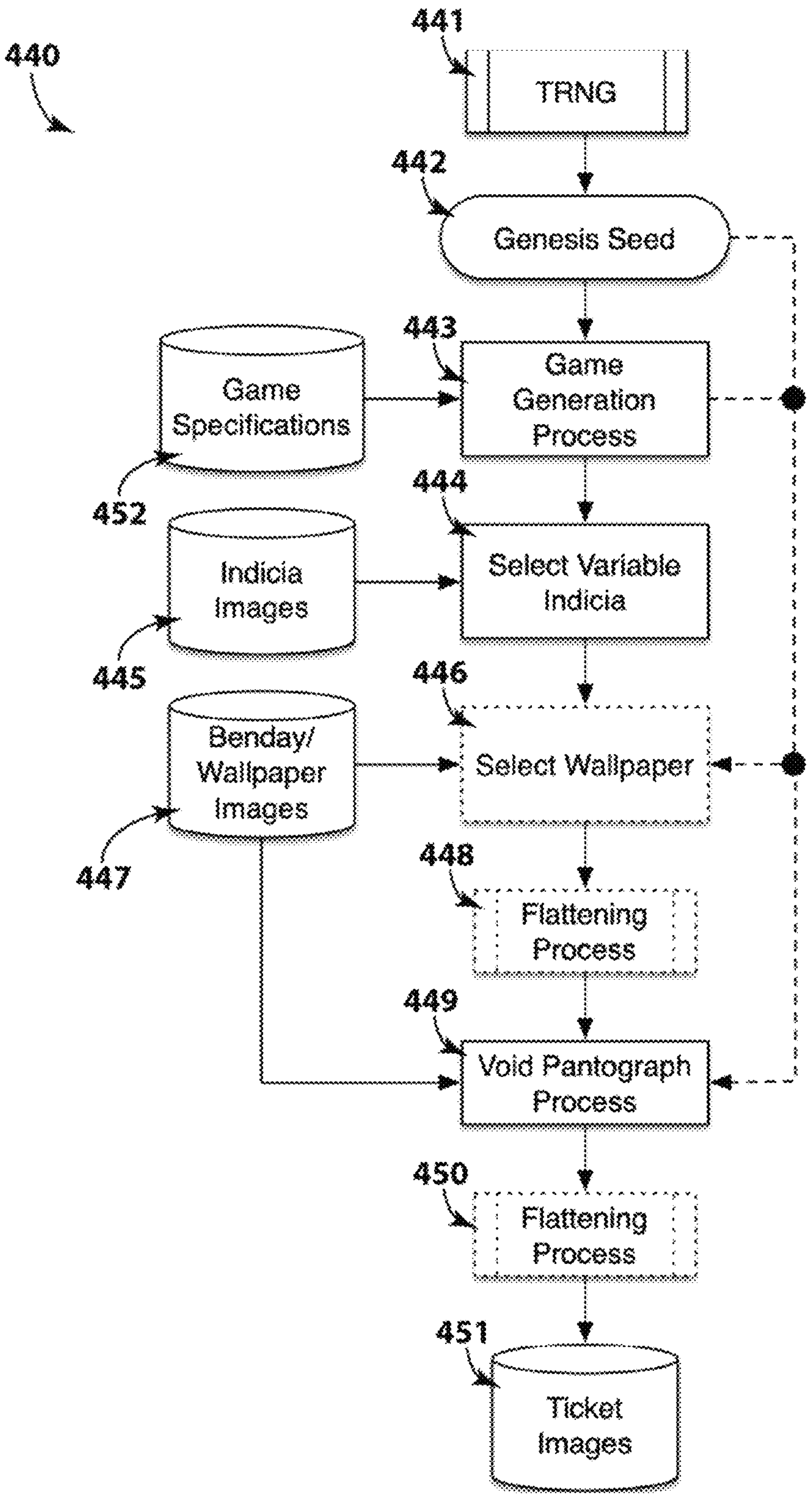
FIG. 4C illustrates an overall block diagram of another representative example system and method of the present disclosure showing a schematic graphical overview for generating instant lottery tickets with one or more void pantographs digitally imaged variable Benday patterns compatible with FIG. 2G.

FIG. 4C illustrates an alternative exemplary method and system 440 for creating the example instant lottery tickets of FIG. 2G with not readily apparent to the human eye imaged Benday patterns in the areas behind and/or on top of the variable indicia. This method includes accessing or obtaining a plurality of already generated Benday and/or imaged background pattern(s) and storing the acquired Benday and/or imaged background patterns in a database 447 (FIG. 4C). The stored Benday and/or imaged background pattern (s) are then applied over/under the selected indicia and optionally over an imaged background pattern ultimately flattened 450 as a group or on a ticket-by-ticket basis before being stored 451 for printing instant lottery tickets.

As before, the method and system of FIG. 4C begins with the creation of a Genesis Seed 442 (optionally created by a TRNG 441) that functions as a starting point for a deterministic game engine 443 to yield a sequence of pseudo-randomized indicia (selected from a pool of possible indicia 445) that are also arranged to comply with the specifications 452 of the instant lottery ticket game being generated. The variable indicia for a given ticket are selected 444 from a pool of all possible different indicia for a given game 445. The selected variable indicia 444 are determined by whether a given ticket is a winner or not, and if it is a winner, what prize should be awarded which are ultimately driven by the Genesis Seed 442.

Once the winning status of a given instant lottery ticket and its associated variable indicia have been selected 444, an optional background imaged background pattern can be selected 446 from a pool of different possible imaged background patterns 447. The optional selection process 446 of imaged background patterns 447 can vary from game-to-game. In various embodiments, the background imaged background and selected indicia layers can be flattened 448 at this point. Next, the not readily apparent to the human eye imaged Benday pattern 447 is garnered and along with the selected indicia and optional imaged background is applied to a Void Pantograph Process 449 that digitally embeds the garnered Benday pattern 447 on top of the background or optional imaged background and (optionally) the selected indicia. Example methods of embedding a pattern of letters (such as the letters "VOID") that are not readily apparent to the human eye into a background image and/or indicia such as described in U.S. Pat. No. 9,087,288 and are readily adaptable to embedding Benday patterns rather than traditional text messages. Similar to the previous embodiments, the selection process for choosing a specific not readily apparent to the human eye Benday pattern for a given instant lottery ticket will vary from game-to-game and can be optionally controlled by the Genesis Seed 442 or the Game Generation Process 443. Regardless of the method employed to select the not readily apparent to the human eye Benday pattern for a given instant lottery ticket, the resulting image can be optionally flattened 450 before saving in non-volatile memory 451 for a future press run.

Figure 5:
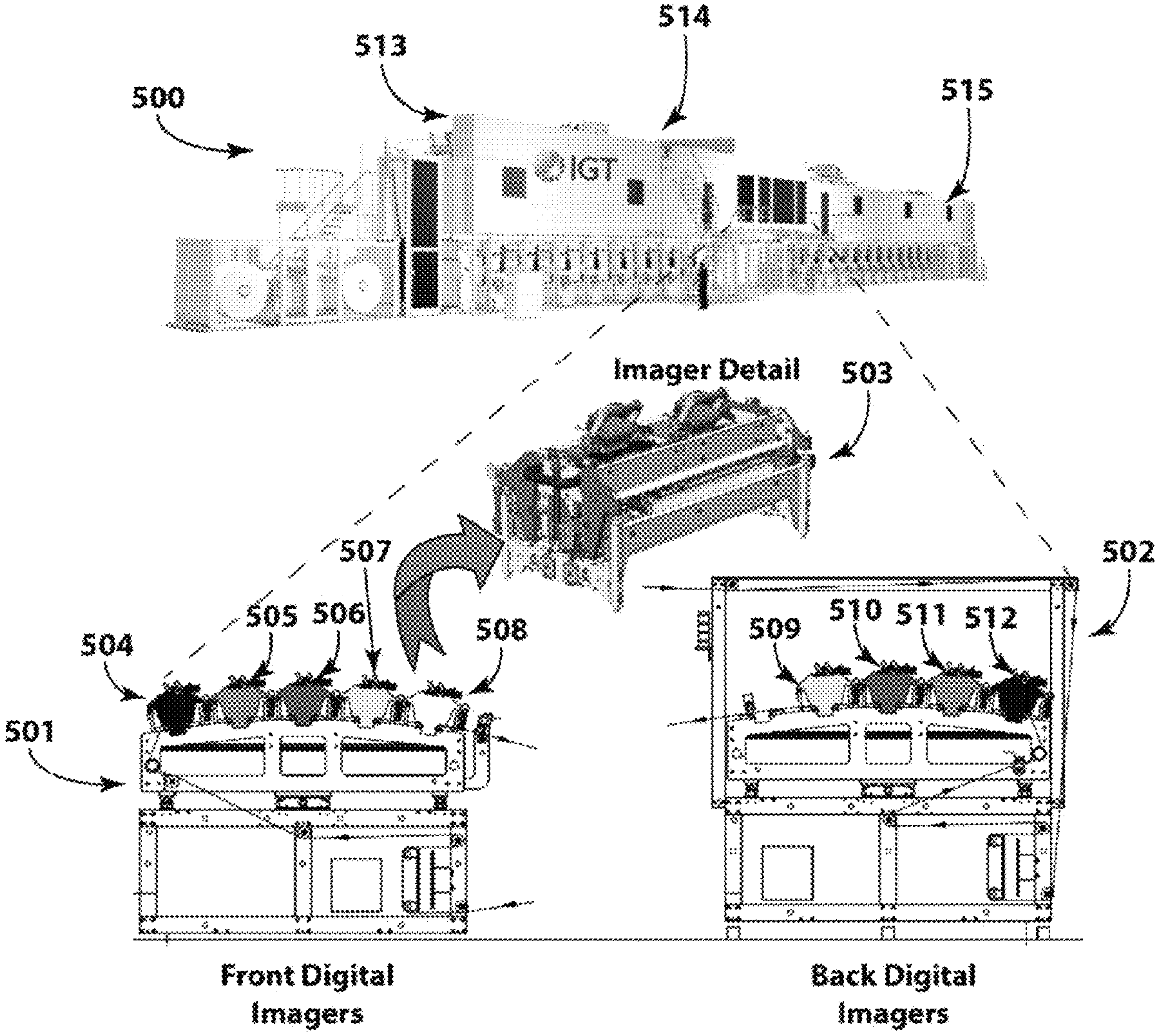
FIG. 5 illustrates an isometric view of an example printing press capable of producing the exemplary tickets of FIGS. 2A thru 2G.

One exemplary press configuration capable of producing the documents such as the example instant lottery tickets of the present disclosure is illustrated in FIG. 5. As shown in FIG. 5, a modified hybrid flexographic and digital imager printing press 500 is used to produce variable indicia instant lottery tickets with Benday images overlayed on the variable indicia as well as Benday imaged backgrounds. The press 500 unravels its paper web substrate from a roll and flexographically prints 513 lower security layers (as well as optionally primer) in the scratch-off area of the instant lottery ticket. At this point, the press' web enters a secured imager room 514 where the front game play variable indicia are applied by CMYK and spot imager 501. However, as disclosed herein with the magnified view of the front imagers 501, the front game play variable indicia and imaged background as well as some Benday patterns are digitally imaged as process colors with the separate Cyan 505, Magenta 506, Yellow 507, and blacK 504 print heads synchronized together to produce a common process color (CMYK) display and game play variable indicia image on the front of the substrate of the instant lottery ticket. Additionally, special "Spot" color imager 508 can be reserved for specialty ink Benday patterns (e.g., UV ink Benday patterns). A detail magnified view of an imager housing is also provided 503 in FIG. 5. Imager 502 is utilized to digitally image CMYK process colors (511, 510, 509, and 512—respectively) on the ticket back. Next, a subsequent series of flexographic print stations 515 printing the upper security layers as well as any decorative overprint. At this point, the web can be rewound into a roll for storage and ultimate processing by a separate packaging line.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

What is claimed is:

1. A plurality of lottery tickets for a single lottery game, the plurality of lottery tickets comprising:

a first lottery ticket comprising:

a first substrate;

a first background imaged on a first area of the first substrate;

first variable indica imaged on a second area of the first substrate;

a first Benday pattern with a first rotational anisotropy imaged in the first background, the Benday pattern printed in a first rotational orientation; and a first scratch-off coating covering at least a portion of the first and second areas of the first substrate; and a second lottery ticket comprising:

a second substrate;

a second background imaged on a first area of the second substrate;

second variable indica imaged on a second area of the second substrate;

a second Benday pattern with a second rotational anisotropy imaged in the second background, the second Benday pattern printed in a second rotational orientation, the second rotational orientation being different than the first rotational orientation, wherein the second Benday pattern is a same pattern as the first second Benday pattern; and a second scratch-off coating covering at least a portion of the first and second areas of the second substrate.

2. The lottery tickets of claim 1, wherein the first Benday pattern covers the second area of the first substrate, and the second Benday pattern covers the second area of the second substrate.

3. The lottery tickets of claim 1, wherein the first Benday pattern comprises a first sine wave and the second Benday pattern comprises a second sine wave.

4. The lottery tickets of claim 3, wherein the first sine wave and the second sine wave are different.

5. The lottery tickets of claim 1, wherein the first Benday pattern is printed with an Ultraviolet (UV) visible dye-based ink and the second Benday pattern is printed with a same Ultraviolet (UV) visible dye-based ink.

6. The lottery tickets of claim 1, wherein the first Benday pattern is printed over the second area of the first substrate and the second Benday pattern is printed over the second area of the second substrate.

7. The lottery tickets of claim 1, wherein the first Benday pattern comprises a first plurality of different process colors and the second Benday pattern comprises a second plurality of different process colors.

8. The lottery tickets of claim 7, wherein the first plurality of different process colors is different than the second plurality of different process colors.

9. The lottery ticket of claim 1, wherein the first background comprises a first plurality of different colors and the second background comprises a second plurality of different colors.

10. A plurality of lottery tickets for a single lottery game, the plurality of lottery tickets comprising:

a first lottery ticket comprising:

a first substrate;

a first background imaged on a first area of the first substrate;

first variable indica imaged on a second area of the first substrate;

a first void pantograph comprising a first Benday pattern with a first rotational anisotropy imaged in the first background, the void pantograph printed in a first rotational orientation; and a first scratch-off coating covering at least a portion of the first and second areas of the first substrate; and a second lottery ticket comprising:

a second substrate;

a second background imaged on a first area of the second substrate;

second variable indica imaged on a second area of the second substrate;

a second void pantograph comprising a second Benday pattern with a second rotational anisotropy imaged in the second background, the second void pantograph printed in a second rotational orientation relative, the second rotational orientation being different than the first rotational orientation; and a second scratch-off coating covering at least a portion of the first and second areas of the second substrate.

11. The lottery tickets of claim 10, wherein the first void pantograph comprises a first sine wave and the second void pantograph comprises a second sine wave.

12. The lottery tickets of claim 11, wherein the first sine wave and the second sine wave are different.

13. The lottery tickets of claim 10, wherein the first void pantograph comprises a first plurality of different process colors and the second void pantograph comprises a second plurality of different process colors.

14. The lottery tickets of claim 13, wherein the first plurality of different process colors is different than the second plurality of different process colors.

* * * * *